(12) United States Patent
Van Dyke et al.

(10) Patent No.: US 6,961,057 B1
(45) Date of Patent: Nov. 1, 2005

(54) METHOD AND APPARATUS FOR MANAGING AND ACCESSING DEPTH DATA IN A COMPUTER GRAPHICS SYSTEM

(75) Inventors: James M. Van Dyke, Sunnyvale, CA (US); James E. Margeson, III, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 781 days.

(21) Appl. No.: 09/687,036

(22) Filed: Oct. 12, 2000

(51) Int. Cl.[7] .............................................. G06T 15/40
(52) U.S. Cl. ........................................................ 345/422
(58) Field of Search ................................ 345/418, 419, 345/422, 421, 420, 423, 426, 427

(56) References Cited

U.S. PATENT DOCUMENTS 6,252,608 B1 * 6/2001 Snyder et al. ............... 345/422

* cited by examiner

Primary Examiner—Mark Zimmerman
Assistant Examiner—Cliff N. Vo
(74) Attorney, Agent, or Firm—Cooley Godward LLP

(57) ABSTRACT

A computer graphics system provides for processing image data including Z data for use in displaying three-dimensional images on a display unit. The system includes: a depth buffer providing for temporary storage of Z data; and a graphics processing unit having a graphics engine for generating image data including Z data, and a memory interface unit communicatively coupled to the graphics engine and communicatively coupled to the depth buffer via a depth buffer interface. The graphics processing unit is operative to compress at least a portion of the generated Z data, to write the compressed portion of Z data to the depth buffer via the depth buffer interface in a compressed format, to read portions of compressed Z data from the depth buffer via the depth buffer interface, and to decompress the compressed Z data read from the buffer. An advantage of the present invention is that effective Z data bandwidth through the depth buffer interface is maximized in order to facilitate fast depth buffer access operations.

43 Claims, 19 Drawing Sheets

470

WRITE WITH Z READ

| Z_TAG_ EXISTS | RDAT_ COMPRESSED | WDAT_ COMPRESSES | FULL_ TILE_READ | ACTION | | |
|---|---|---|---|---|---|---|
| | | | | COMPRESS | FULL_ WRITE | RMW_ DISABLE |
| 0 | 0 | X | X | 0 | 0 | 1 |
| 1 | 0 | X | X | 0 | 0 | 1 |
| 1 | 1 | X | X | 0 | 1 | 1 |
| 1 | 0 | 0 | X | 0 | 0 | 1 |
| 1 | 0 | 1 | 1 | 1 | 0 | 1 |
| 1 | 1 | 0 | X | 0 | 1 | 1 |
| 1 | 1 | 1 | 1 | 1 | 0 | 1 |

WRITE WITHOUT Z READ

| Z_TAG_ EXISTS | Z_COMP_ OK | RDAT_ COMPRESSED | WDAT_ COMPRESSES | FULL_ COVG | ACTION | | |
|---|---|---|---|---|---|---|---|
| | | | | | COMPRESS | FULL_ WRITE | RMW_ DISABLE |
| 0 | 0 | - | X | X | 0 | 0 | 1 |
| 1 | 0 | - | X | 0 | 0 | 0 | 0 |
| 1 | 0 | - | X | 1 | 0 | 0 | 1 |
| 1 | 1 | - | 0 | 0 | 0 | 0 | 0 |
| 1 | 1 | - | 0 | 1 | 0 | 0 | 1 |
| 1 | 1 | - | 1 | 1 | 1 | 0 | 1 |

FAST CLEAR

| Z_TAG_EXISTS | Z_COMP_OK | RDAT_COMPRESSED | WDAT_COMPRESSES | FULL_COVG | ACTION | | |
|---|---|---|---|---|---|---|---|
| | | | | | COMPRESS | FULL_WRITE | RMW_DISABLE |
| 0 | 0 | - | 1 | X | 0 | 0 | 1 |
| 1 | 0 | - | 1 | 0 | 0 | 0 | 1 |
| 1 | 0 | - | 1 | 1 | 0 | 0 | 1 |
| 1 | 1 | - | 1 | 0 | 1 | 0 | 1 |
| 1 | 1 | - | 1 | 1 | 1 | 0 | 1 |

FIG. 7C

|  |  |  |  |  |  |  |  |
|---|---|---|---|---|---|---|---|
| Z0 | Z1 | Z2 | Z3 | Z4 | Z5 | Z6 | Z7 |
| Z8 | Z9 | Za | Zb | Zc | Zd | Ze | Zf |
| Z10 | Z11 | Z12 | Z13 | Z14 | Z15 | Z16 | Z17 |
| Z18 | Z19 | Z1a | Z1b | Z1c | Z1d | 1e | Z1f |

|  |  |  |  |
|---|---|---|---|
| Z0 | Z1 | Z2 | Z3 |
| Z4 | Z5 | Z6 | Z7 |
| Z8 | Z9 | Za | Zb |
| Zc | Zd | Ze | Zf |

| | |
|---|---|
| Z2 | anchor unsigned 16 bits |
| Z4_diff = Z4 − Z2 | pred 12 bits |
| Z12_diff = Z12 - Z2 | pred 12 bits |
| Z0_diff = Z0 − (Z2 − Z4_diff) | pred 3 bits |
| Z1_diff = Z1 − (Z2 − Z4_diff/2.0) | pred 3 bits |
| Z3_diff = Z3 − (Z2 + Z4_diff/2.0) | pred 3 bits |
| Z5_diff = Z5 − (Z2 + 3*Z4_diff/2.0) | pred 3 bits |
| Z6_diff = Z6 - (Z2 + 2*Z4_diff) | pred 3 bits |
| Z7_diff = Z7 - (Z2 + 5*Z4_diff/2.0) | pred 3 bits |
| Z8_diff = Z8 - (Z2 - Z4_diff + Z12_diff/2.0) | pred 3 bits |
| Z9_diff = Z9 - (Z2 - Z4_diff/2.0 + Z12_diff/2.0) | pred 3 bits |
| Za_diff = Za - (Z2 + Z12_diff/2.0) | pred 3 bits |
| Zb_diff = Zb - (Z2 + Z4_diff/2.0 + Z12_diff/2.0) | pred 3 bits |
| Zc_diff = Zc - (Z2 + Z4_diff + Z12_diff/2.0) | pred 3 bits |
| Zd_diff = Zd - (Z2 + 3*Z4_diff/2.0 + Z12_diff/2.0) | pred 3 bits |
| Ze_diff = Ze - (Z2 + 2*Z4_diff + Z12_diff/2.0) | pred 3 bits |
| Zf_diff = Zf - (Z2 + 5*Z4_diff/2.0 + Z12_diff/2.0) | pred 3 bits |
| Z10_diff = Z10 - (Z2 - Z4_diff + Z12_diff) | pred 3 bits |
| Z11_diff = Z11 - (Z2 - Z4_diff/2.0 + Z12_diff) | pred 3 bits |
| Z13_diff = Z13 - (Z2 + Z4_diff/2.0 + Z12_diff) | pred 3 bits |
| Z14_diff = Z14 - (Z2 + Z4_diff + Z12_diff) | pred 3 bits |
| Z15_diff = Z15 - (Z2 + 3*Z4_diff/2.0 + Z12_diff) | pred 3 bits |
| Z16_diff = Z16 - (Z2 + 2*Z4_diff + Z12_diff) | pred 3 bits |
| Z17_diff = Z17 - (Z2 + 5*Z4_diff/2.0 + Z12_diff) | pred 3 bits |
| Z18_diff = Z18 - (Z2 - Z4_diff + 3*Z12_diff/2.0) | pred 3 bits |
| Z19_diff = Z19 - (Z2 - Z4_diff/2.0 + 3*Z12_diff/2.0) | pred 3 bits |
| Z1a_diff = Z1a - (Z2 + 3*Z12_diff/2.0) | pred 3 bits |
| Z1b_diff = Z1b - (Z2 + Z4_diff/2.0 + 3*Z12_diff/2.0) | pred 3 bits |
| Z1c_diff = Z1c - (Z2 + Z4_diff + 3*Z12_diff/2.0) | pred 3 bits |
| Z1d_diff = Z1d - (Z2 + 3*Z4_diff/2.0 + 3*Z12_diff/2.0) | pred 3 bits |
| Z1e_diff = Z1e - (Z2 + 2*Z4_diff + 3*Z12_diff/2.0) | pred 3 bits |
| Z1f_diff = Z1f - (Z2 + 5*Z4_diff/2.0 + 3*Z12_diff/2.0) | pred 3 bits |
| fast_clear | 1 bit |

670 

| Compression format 16 bit Z: |
|---|
| bits [127:64]<br>    {Z1f_diff [2:0],<br>    Z1e_diff [2:0], Z1d_diff [2:0], Z1c_diff [2:0], Z1b_diff [2:0],<br>    Z1a_diff [2:0], Z19_diff [2:0], Z18_diff [2:0], Z17_diff [2:0],<br>    Z16_diff [2:0], Z15_diff [2:0], Z14_diff [2:0], Z13_diff [2:0],<br>    Z11_diff [2:0], Z10_diff [2:0], Zf_diff [2:0], Ze_diff [2:0],<br>Zd_diff [2: 0], Zc_diff [2:0], Zb_diff [2:0], Za_diff [2:0], Z9_diff [2]} |
| bits [63:0] =<br>    {fast_clear, Z9_diff [1:0], Z8_diff[2:0], Z7_diff[2:0], Z6_diff[2:0],<br>    Z5_diff [2:0], Z3_diff [2:0], Z1 _diff [2:0], Z0_diff [2:0],<br>    Z12_diff [11:0], Z4_diff [11:0], Z2 [15:0]} |
| When cleared:<br>    bits [63:0] = (1'b1, 47'b0, Z_clear_value[15:0]} |

FIG. 11B

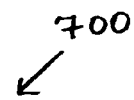

| Z5 | anchor unsigned 24 bits |
|---|---|
| Z6_diff = Z6 - Z5 | pred 15 bits |
| Z9_diff = Z9 - Z5 | pred 15 bits |
| Z0_diff = Z0 - (Z5 - Z9_diff - Z6_diff) | pred 5 bits |
| Z1_diff = Z1 - (Z5 - Z9_diff) | pred 5 bits |
| Z2_diff = Z2 - (Z5 - Z9_diff + Z6_diff) | pred 5 bits |
| Z3_diff = Z3 - (Z5 + 2*Z6_diff - Z9_diff) | pred 5 bits |
| Z4_diff = Z4 - (Z5 - Z6_diff) | pred 5 bits |
| Z7_diff = Z7 - (Z5 + 2*Z6_diff) | pred 5 bits |
| Z8_diff = Z8 - (Z5 + Z9_diff - Z6_diff) | pred 5 bits |
| Za_diff = Za - (Z5 + Z9_diff + Z6_diff) | pred 5 bits |
| Zb_diff = Zb - (Z5 + Z9_diff + 2*Z6_diff) | pred 5 bits |
| Zc_diff = Zc - (Z5 + 2*Z9_diff - Z6_diff) | pred 5 bits |
| Zd_diff = Zd - (Z5 + 2*Z9_diff) | pred 5 bits |
| Ze_diff = Ze - (Z5 + 2*Z9_diff + Z6_diff) | pred 5 bits |
| Zf_diff = Zf - (Z5 + 2*Z9_diff + 2*Z6_diff) | pred 5 bits |
| fast_clear | 1 bit |

METHOD AND APPARATUS FOR MANAGING AND ACCESSING DEPTH DATA IN A COMPUTER GRAPHICS SYSTEM

BACKGROUND OF THE INVENTION

1. Field of the Invention

The present invention relates generally to graphics processing systems, and more specifically to an improved method and apparatus for managing the storage of depth data in a depth buffer of a graphics processing system.

2. Description of the Prior Art

FIG. 1 shows a generalized block diagram illustrating a typical prior art computer graphics system at 2 generally including: a graphics processing unit 4; a display unit 5 coupled with the graphics processing unit 4 via an interface 6; and a local memory unit 7 communicatively coupled with the graphics processing unit, the local memory unit providing temporary storage of image data for displaying a 3-dimensional (3-D) image on the display unit. The local memory unit 7 includes: a refresh buffer (not shown) for storing intensity values for each of a plurality of (x, y) pixel positions on the display unit 5; and at least one depth buffer, or Z buffer, 8 coupled with the graphics processing unit 4 via a Z buffer memory interface 9. In operation, the graphics processing unit 4 generates image data which is temporarily stored in the local memory unit 7, the image data including Z data which is temporarily stored in the Z buffer.

The graphics processing unit 4 typically includes a 3D graphics pipeline (not shown) for processing data in the form of object descriptions. Generally, object surfaces are formed by one or more polygon surfaces. Object descriptions are typically converted to projection coordinates by the graphics pipeline, each (x, y, z) position on a polygon surface corresponding to an orthographic projection point (x, y) on a view plane of a scene to be displayed. As object surfaces are generated by the graphics pipeline, it must be determined which of the surfaces located at each (x, y) pixel position is visible because portions of some object surfaces are obscured behind others and it must be determined which object surfaces are visible.

The Z buffer 8 is used in accordance with a Z buffer method of detecting the visible surfaces of objects defined in 3-D image space by comparing surface depths, that is the Z values, of the predefined objects. The Z buffer 8 is used as a scratch buffer for storing depth data including Z values for each of the (x, y) pixel positions of a 3-D image. The depth of a displayed object is usually measured from a view plane along the Z axis of a viewing system. Typically, Z values range from zero at a back clipping plane, which is furthest away, to a maximum value at a front clipping plane which is closest. The Z buffer 8 provides for storing the Z values for each of the (x, y) pixel positions as surfaces are processed.

In accordance with the Z buffer method, each surface of a scene to be displayed on the display unit 5 is processed separately. The Z buffer process is equivalent, for each point (x, y) to a search to find that point with the maximum Z value. Initially, all positions in the Z buffer are set to 0 (minimum depth). Each object surface is then processed by determining a current depth value at each associated (x, y) pixel position. Each of the current depth values is then compared to an associated previous depth value stored in the Z buffer 8, and if the current depth value is greater than the previous depth value, the current depth value is stored in its place.

The Z buffer 8 is usually implemented using at least one dynamic random access memory (DRAM) chip having a plurality of pins for connection to associated pins of the graphics processing unit 4, the pin connections comprising the Z buffer memory interface 9. Because the Z buffer memory interface 9 comprises a limited number of pin connections, the bandwidth of the interface 9 is limited and therefore the amount of Z data that can be accessed by the graphics processing unit in the Z buffer in a given period of time is limited. The bandwidth limitation of the interface 9 imposes a limit on the performance of the system because the graphics pipeline generates and compares Z data faster than the Z data can be accessed.

In some prior art graphics systems, the Z buffer 8 is implemented on the same IC chip as graphics processing unit 4 thereby allowing for an unlimited number of connections between the graphics processing unit and the Z buffer. However, this solution is not feasible because silicon real estate in the graphics processing unit 4 is very limited and very expensive.

What is needed is an improved method and apparatus for managing depth data in a graphics display system so that the performance of the graphics system is not limited by the time required to access the depth data.

SUMMARY OF THE INVENTION

It is an object of the present invention to provide an improved method and apparatus for managing depth data in a graphics display system so that performance of the graphics system is not limited by the time required to access the depth data.

Briefly, a presently preferred embodiment of the present invention provides a computer graphics system for processing image data including Z data for use in displaying three dimensional images on a display unit. The system includes: a depth buffer providing for temporary storage of Z data; and a graphics processing unit having a graphics engine for generating image data including Z data, and a memory interface unit communicatively coupled to the graphics engine and communicatively coupled to the depth buffer via a depth buffer interface. The graphics processing unit is operative to compress at least a portion of the generated Z data, to write the compressed portion of Z data to the depth buffer via the depth buffer interface in a compressed format, to read portions of compressed Z data from the depth buffer via the depth buffer interface, and to decompress the compressed Z data read from the buffer. An advantage of the present invention is that effective Z data bandwidth through the depth buffer interface is maximized in order to facilitate fast depth buffer access operations.

In accordance with one aspect of the present invention, the graphics processing unit is operative to compress selected ones of a plurality of tiles of the generated Z data based on a quantitative analysis of the Z data, each of the tiles of Z data having a plurality of pixels arranged in an array, each of the pixels being disposed at an associated (X,Y) coordinate of the array, and having an associated Z value. The graphics processing unit is operative to perform a process of compressing a tile of Z data. In one embodiment, the compression process includes the steps of: reading an anchor Z value associated with a selected anchor pixel of the tile; reading a major horizontal Z value associated with a major horizontal pixel displaced a first predetermined number of pixels in a horizontal direction from the anchor pixel; determining a major horizontal difference value between the anchor Z value and the major horizontal Z value; determining a horizontal gradient value based on the horizontal difference value and the first predetermined number of pixels; reading a major vertical Z value associated with a major vertical pixel displaced a second predetermined number of pixels in a vertical direction from the anchor pixel; determining a major vertical difference value between the anchor Z value and the major vertical Z value; determining a vertical gradient value based on the vertical difference value and the second predetermined number of pixels; determining an ideal plane based on the anchor Z value, the horizontal gradient value, and the vertical gradient value; for each of a plurality of remaining pixels of the tile, determining an associated ideal Z value lying in the ideal plane at the (X,Y) coordinate of the associated remaining pixel; and for each of the remaining pixels, determining an associated minor Z difference value by determining a difference between the associated ideal Z value and the associated Z value.

The foregoing and other objects, features, and advantages of the present invention will be apparent from the following detailed description of the preferred embodiment which makes reference to the several figures of the drawing.

IN THE DRAWING

FIGS. 7A through 7C are table diagrams illustrating values of signals generated and received by components of the ZROP unit of FIG. 6A;

FIG. 11A is a table diagram illustrating relationships for determining compression predictor values, or difference values, for each of the Z values of the 16-bit mode tile region of FIG. 10A;

FIG. 11B is a table diagram illustrating a 16-bit mode compression format;

FIG. 12A is a table diagram illustrating relationships for determining compression predictor values for each of the Z values of the 32-bit mode tile region of FIG. 10B.

DETAILED DESCRIPTION OF THE PREFERRED EMBODIMENTS

Figure 2A:
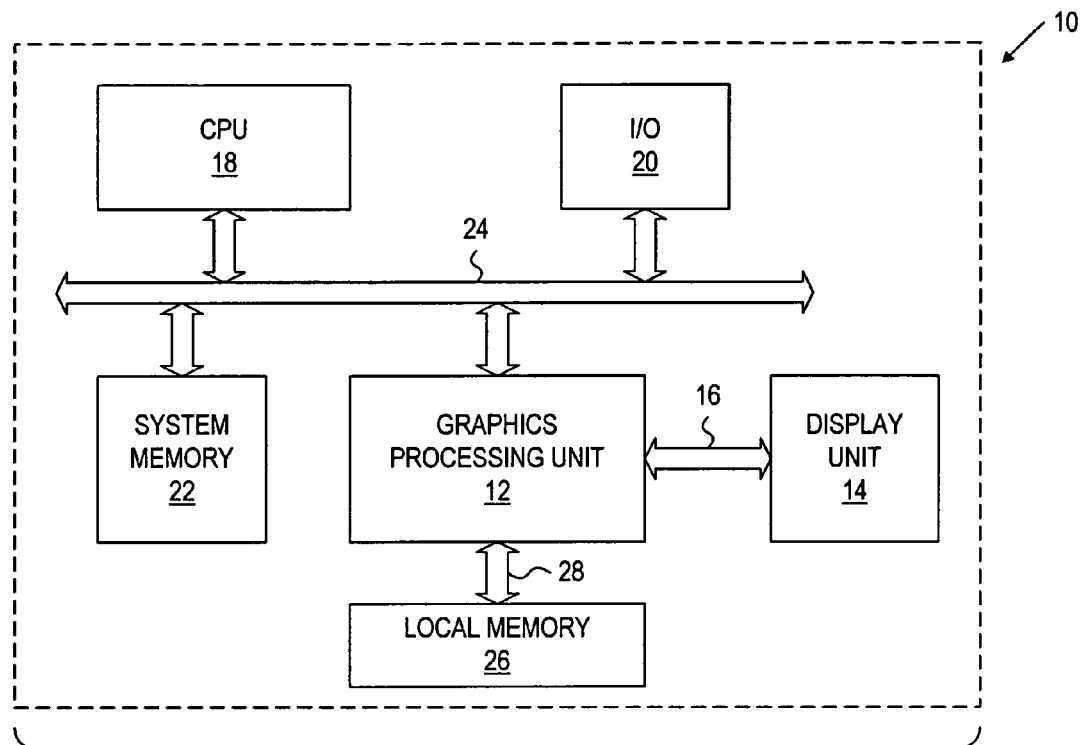
FIG. 2A is a generalized block diagram illustrating a computer system in accordance with the present invention including a graphics processing unit, and a local memory unit having a Z buffer coupled with the graphics processing unit via a local memory interface.

FIG. 2A shows a generalized block diagram illustrating a computer graphics system at 10 including: a graphics processing unit 12 in accordance with the present invention; a display unit 14 coupled with unit 12 via an interface 16; a central processing unit 18, an input/output unit 20, and a system memory unit 22 each being coupled with the unit 12 via a system bus 24; and a local memory unit 26 communicatively coupled with the graphics processing unit 12 via a local memory interface 28. In operation, the graphics processing unit 12 receives image display instructions and image data from clients such as the CPU 18 via the system bus 20, and executes the instructions resulting in the storage of image data in the local memory unit 26. The graphics processing unit 12 also provides for scanning image data from the frame buffer 42.

Figure 1:
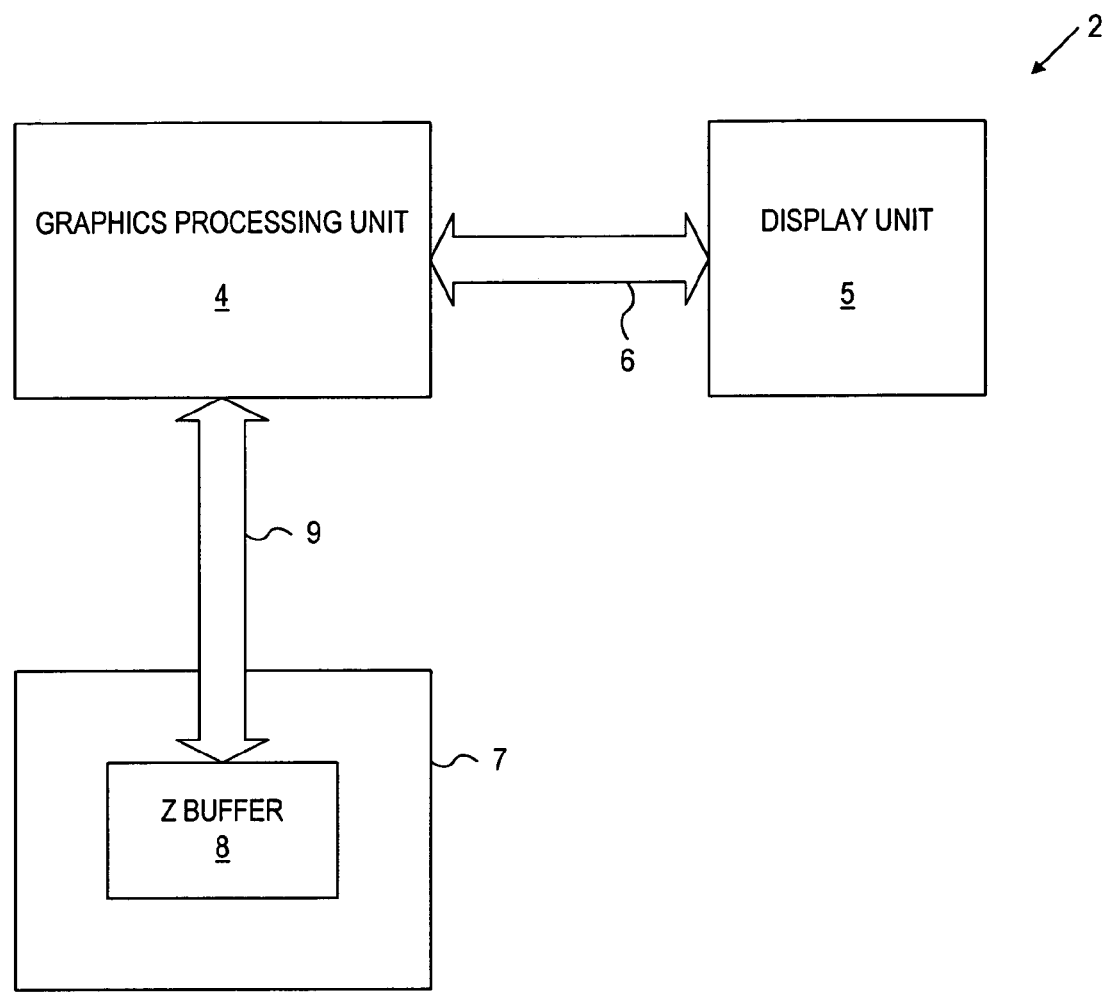
FIG. 1 is a block diagram illustrating a prior art computer graphics system.
Figure 2B:
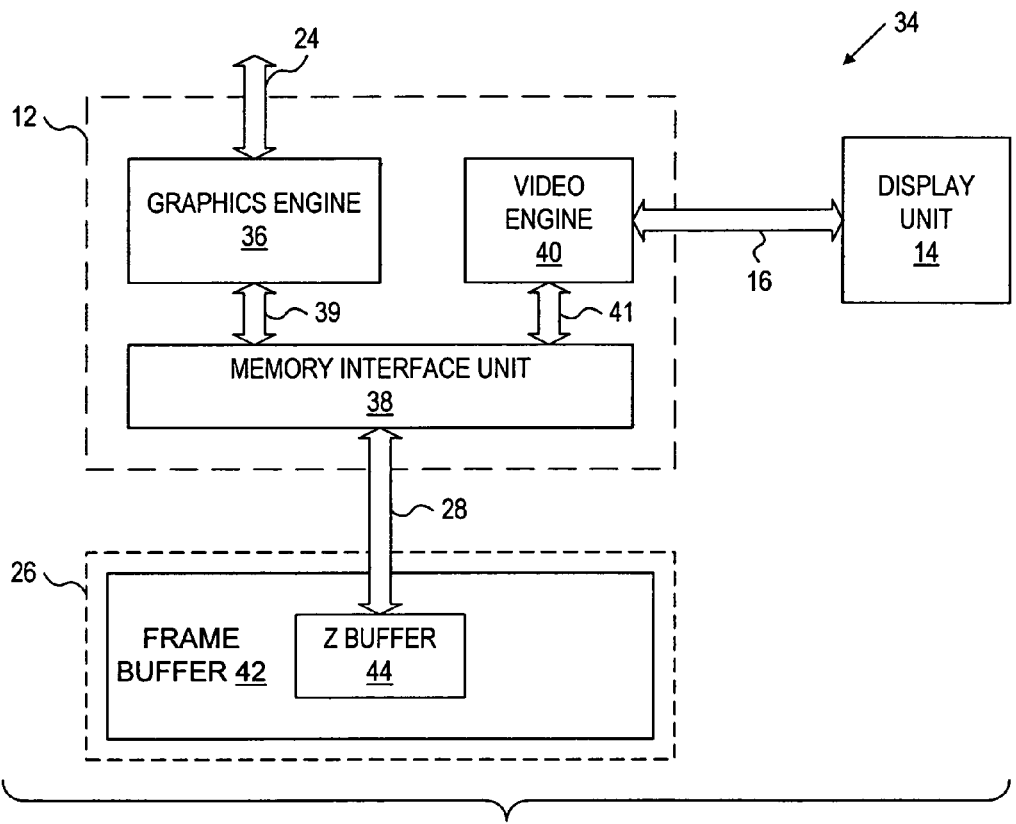
FIG. 2B is a schematic block diagram illustrating further details of the graphics processing unit of FIG. 2A including a graphics engine, and a memory interface unit operative to manage the storage of portions of Z data in a compressed format in the Z buffer.

FIG. 2B shows a schematic block diagram illustrating further details of the graphics processing unit 12 (FIG. 1) at 34 in accordance with the present invention. The graphics processing unit 12 includes: a graphics engine 36 coupled with the CPU 18 (FIG. 2A), system memory unit 22, and input/output unit 20 via the system bus 24; a memory interface unit 38 coupled with the graphics engine 36 via an interface 39; and a video engine 40 coupled with the memory interface unit 38 via an interface 41, and also being coupled with the display unit 14 via interface 16. The local memory unit 26 includes a frame buffer 42 coupled with the memory interface unit 38 via interface 28. The frame buffer 42 includes: a refresh buffer (not shown) for storing intensity values for each of a plurality of (x, y) pixel positions; and at least one depth buffer, or Z buffer, 44 that is used to store depth data for each of the (x, y) pixel positions.

In one embodiment, the frame buffer 42 including the Z buffer 44 is implemented using a DRAM chip having a plurality of pins for connection to associated pins of the graphics processing unit 12, the pin connections comprising the local memory interface 28. The graphics processing unit 12 is operative to generate and compress Z data for storage in the Z buffer 44. The Z values are compressed by compression engines of the graphics processing unit as further explained below, transmitted to the Z buffer 44 via interface 28, and stored in the Z buffer in a compressed format. Compressed portions of the Z data are later read from the Z buffer via interface 28 and decompressed by decompression engines. Compression and decompression of portions of the Z data allows for improved utilization of the limited bandwidth of the local memory interface 28. As further explained below, fast clear operations in accordance with the present invention provide a particularly large increase in effective Z data bandwidth. Because the Z values are written out in a compressed format, the read and write operations may be performed very quickly, thereby allowing for increased performance of Z buffering operations.

During Z buffer operations, comparisons are made between previous Z values and current Z values for each pixel. A phenomenon of popping, wherein a far object undesirably pops in front of a near object, could occur if an error in a Z value results in an erroneous determination of the nearer object. Therefore, the Z compression process is made loss-less in order to prevent the occurrence of popping. As further explained below, portions of Z values compress well because Z values tend to be planar on a polygon.

Figure 3:
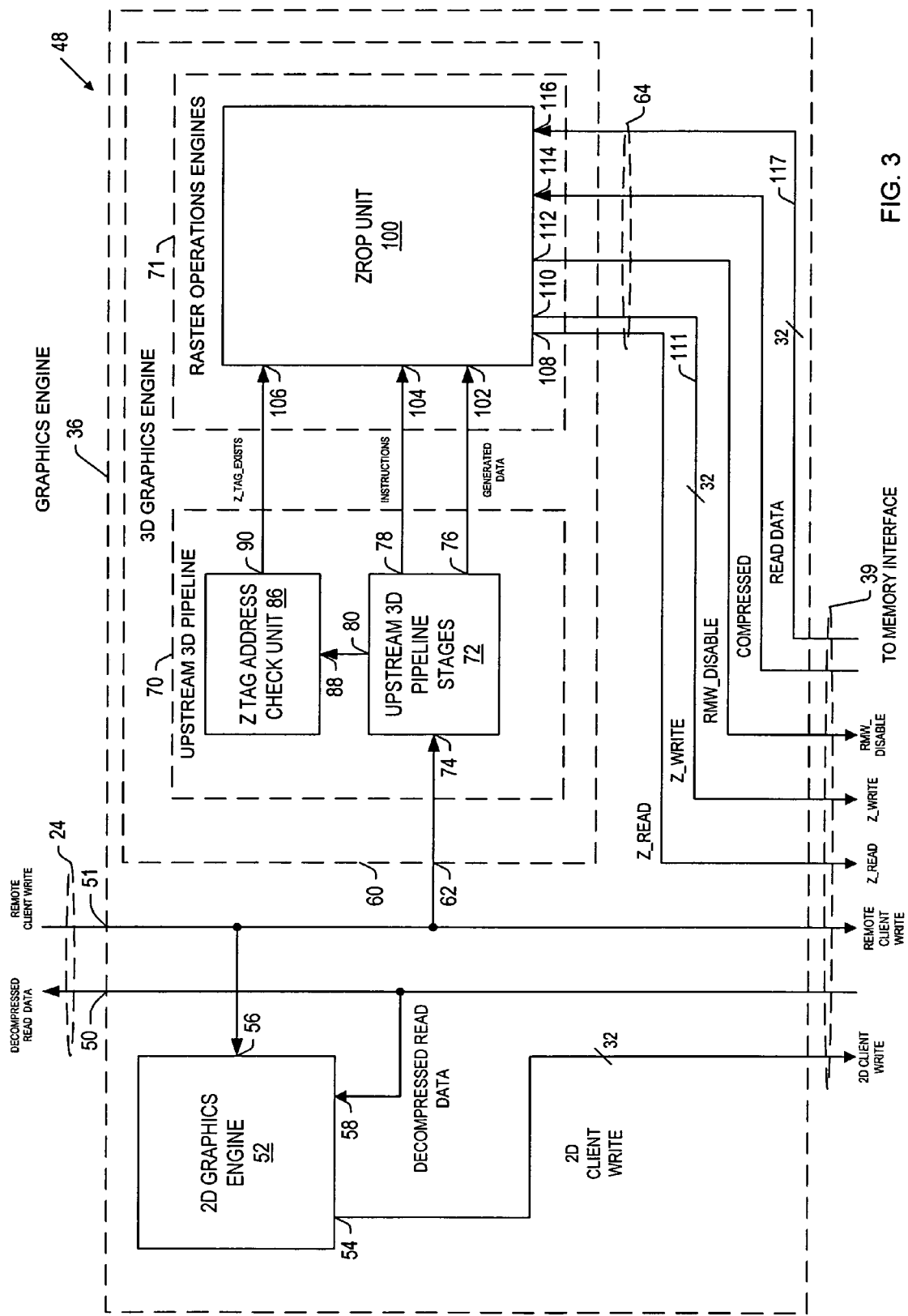
FIG. 3 is a generalized schematic circuit block diagram illustrating further details of the graphics engine of FIG. 2B.

FIG. 3 shows a generalized schematic circuit block diagram illustrating further details of the graphics engine 36 (FIG. 2B) at 48 in accordance with the present invention. The graphics engine 36 includes: an output port 50 providing image data including Z values read from the Z buffer 44 to remote clients such as the CPU 18 (FIG. 2A) via the system bus 24; a port 5; and a plurality of ports comprising the interface 39 for accessing the Z buffer 44 (FIG. 2B) via the memory interface unit 38 (FIG. 2B).

The graphics engine 36 includes: at least one local client 52 such as a 2D graphics engine having an output port 54 providing write requests, write address information, and write Z data to the memory interface unit 38 (FIG. 2B), an input port 56 for receiving remote client write requests and write data (such as from the CPU) via the system bus, an input port 58 for receiving image data including Z values read from the Z buffer via the memory interface unit 38 (FIG. 2B); and a 3D graphics engine 60 having an input port 62, and a plurality of ports 64 for transmitting and receiving Z data including compressed Z data to and from the Z buffer.

The 3D graphics engine 60 includes: an upstream 3D pipeline sub-system 70 for generating transformed primitive data including Z values associated with generated polygons such as triangles, and rasterizing instructions including Z buffer management instructions; and raster operations engines 71 for rasterizing the primitive data received from the upstream 3D pipeline sub-system 70. The upstream 3D pipeline sub-system 70 includes a depth value tag address check unit 86 having an output port 90 providing a signal designated Z_TAG_EXISTS carrying values indicative of whether compression status information is available for corresponding portions of Z data stored at associated memory address locations of the Z buffer 44 (FIG. 2B), the compression status information indicating whether or not an associated portion of Z data is stored in a compressed format; and upstream 3D pipeline stages 72 having an output port 76 providing generated image data including generated Z values, and an instructions output port 78 providing Z buffer management instructions including (1) a write with ZREAD instruction, (2) a write without ZREAD instruction, and (3) a fast clear instruction.

The raster operations engines 71 includes a Z data raster operations unit (ZROP unit) 100 which includes: an input port 102 for receiving the generated Z data from port 76 of the upstream 3D pipeline stages 72; an instructions input port 104 for receiving the Z buffer management instructions from port 78 of the upstream 3D pipeline stages; an input port 106 for receiving the Z_TAG_EXISTS signal from the Z-tag address check unit 86; a depth data read output port 108 providing a signal designated Z_READ carrying Z buffer read address information, and Z buffer read requests to an arbiter of the memory interface 38 (FIG. 2B); a port 110 providing a signal designated Z_WRITE carrying Z buffer write requests, Z buffer address information, and Z write data to the arbiter of the memory interface unit; a port 112 providing a read-modify-write (RMW) control signal designated RMW_DISABLE to the memory interface 38 (FIG. 2B) for selectively disabling RMW operations performed by the memory interface unit on selected portions of Z data; a port 114 for receiving a COMPRESSED signal from the memory interface indicating whether each portion of Z data is being provided to the ZROP unit 100 in a compressed format; and a port 116 for receiving Z data read from the Z buffer. Note that the RMW_DISABLE signal is asserted when the ZROP unit accesses the Z buffer.

RMW operations are inherent to Z buffer operations which include the steps of: receiving current generated Z values from upstream stages of the 3D pipeline; reading previous Z values from associated memory locations in the Z buffer; merging the current Z data with the previous Z data; and then writing back the merged data to the Z buffer. In accordance with the present invention, the ZROP unit 100 provides enhanced performance RMW operations for all Z data generated by the upstream 3D pipeline stages thereby eliminating the need for slower performance RMW operations by the memory interface unit. However, the memory interface unit 38 (FIG. 2B) provides RMW operations on behalf of clients such as the CPU and 2D graphics engine which are not capable of reading and writing Z data in a compressed format.

The CPU and 2D graphics engine 52 (FIG. 3) are operative to write and read Z data to and from the Z buffer via the memory interface unit in 8 byte bursts each requiring one clock cycle. The CPU and 2D graphics engine may access an 8-byte portion of Z data stored in the Z buffer by providing a unique memory address value to the memory interface unit which is responsive to the unique memory address value and operative to provide the stored contents of an associated region of the Z buffer. However, because the ZROP unit 100 (FIG. 3) and the memory interface unit are operative to read Z data in a compressed format, a tile addressing scheme is provided for the ZROP unit and memory interface unit to access tiles of Z data.

Figure 4A:
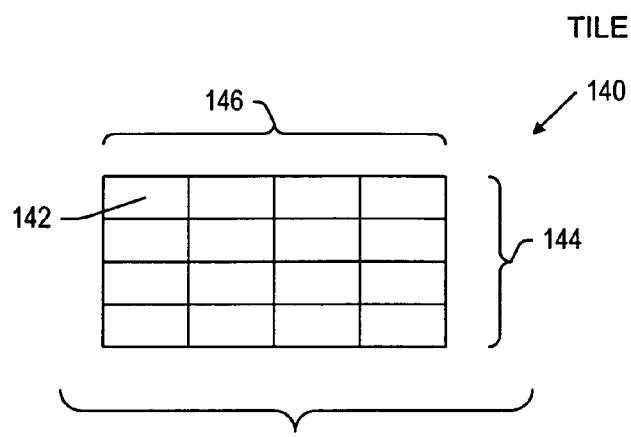
FIG. 4A is a generalized block diagram illustrating an exemplary tile region including a plurality of pixels defining a compressible region of the Z buffer.

FIG. 4A shows a generalized block diagram illustrating an exemplary tile region at 140 including a plurality of pixels 142 defining a compressible region of the Z buffer for which an associated tile of Z data may be stored in a compressed format. In varying embodiments of the present invention, the height 144 and the width 146 of the tile region may vary. In one embodiment, the width of the tile is 16 bytes, and the height is 4 pixels. In accordance with the present invention, a tile region 140 of the Z buffer may be accessed by the graphics processing unit using a single tile memory address value. In one embodiment, an 8-byte portion of Z data is accessed in the Z buffer using a single address value, and an address value indicating the first 8-byte portion of the tile of Z data, associated with the upper left hand portion of the depicted tile region, is used as the tile memory address value.

In an alternative embodiment of the present invention, the graphics processing unit is operative to compress selected tiles of Z data based on a quantitative analysis of the Z data wherein each of the tiles of Z data has a plurality of pixels arranged in a jittered pattern, each of the pixels being disposed at an associated irregular (X,Y) sample point, and having an associated Z value. Since vertical and horizontal gradients can be calculated, plane values can also be calculated at irregular (X,Y) sample points.

Figure 4B:
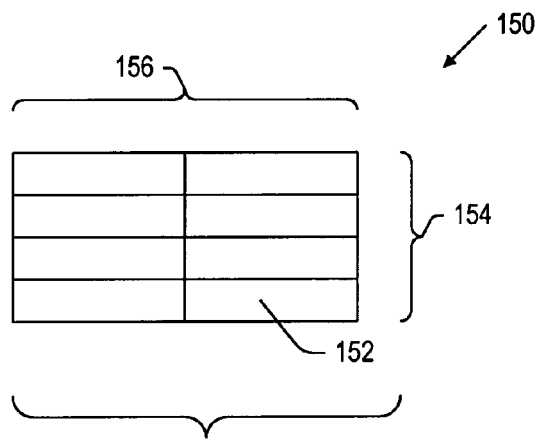
FIG. 4B is a generalized block diagram illustrating a fetch mask having a plurality of fetch mask values each specifying an associated portion of a tile of Z data.

FIG. 4B shows a generalized block diagram illustrating an exemplary fetch mask at 150 having a plurality of fetch mask values 152 each for specifying whether or not an associated portion of a tile of Z data is to be accessed in the Z buffer. In varying embodiments, each of the fetch mask values 152 may be associated with a different number of pixels and therefore a different number of Z values. In one embodiment, each of the fetch mask values 152 is associated with 8-bytes of Z data which may be accessed in the Z buffer during one clock cycle.

In one embodiment of the present invention, only the ZROP unit 100 (FIG. 3) is operative to use fetch masks for specifying portions of the tile 140 (FIG. 4A) of Z data. In an alternative embodiment, fetch masks may be used by each of the clients accessing the Z buffer for the purpose of specifying Z values associated with particular pixels.

As mentioned above, the clients accessing the Z buffer include: the ZROP unit 100 (FIG. 3); and the CPU and 2D graphics engine 52 (FIG. 3), each of which must rely on the memory interface unit 38 (FIG. 2A) for decompressing Z data that is read from the Z buffer in a compressed format. As an example, the CPU, in the process of executing instructions of a graphics application, may need to write Z data to specified pixels 142 (FIG. 4A) of a specified tile region of the Z buffer. In this case, a fetch mask 150 is generated by the memory interface unit 38 (FIG. 2B), as further explained below, in order to fetch only the desired Z data. A memory address value specifies the particular tile region of the memory interface unit 38 (FIG. 2B). The memory interface unit is responsive to memory address values and fetch information received from the clients of the Z buffer, and operative to read specified portions of tiles of Z data from the Z buffer. Note that when the ZROP unit 100 (FIG. 3) needs to access an entire tile 140 (FIG. 4A) of Z data that is stored in an uncompressed format, the ZROP unit provides a single memory address value indicating the particular tile, along with the fetch mask 150 (FIG. 4B) having all of the fetch mask values set to one. Note that fetch masks are not used in writing Z data, but only for reading Z data. Uncompressed Z data may be written in 8 byte bursts.

Figure 4C:
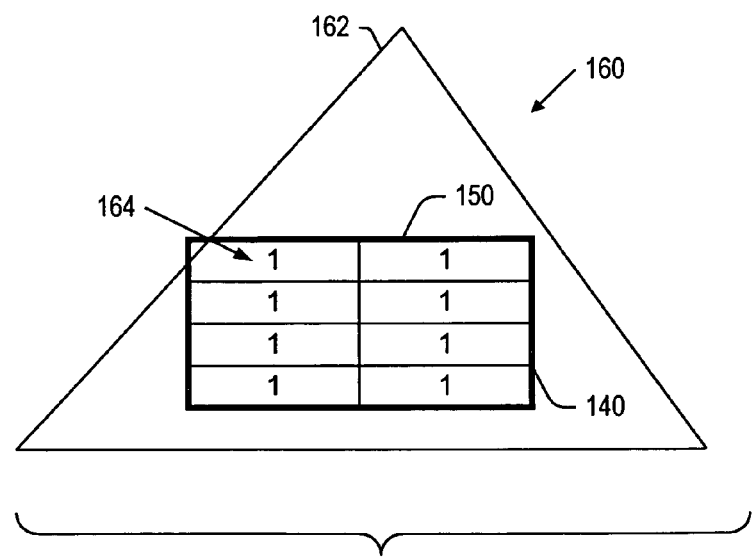
FIG. 4C is a block diagram generally illustrating a fetch mask used in accordance with the present invention.

FIG. 4C shows a block diagram at 160 illustrating a tile 140 and an associated fetch mask 150, the tile 140 being intersected by a triangle 162. Consider that a tile of Z data associated with the tile region 140 is stored in an uncompressed format in the Z buffer, and that the ZROP unit needs to write to only an intersecting portion 164 of the tile region 140 that intersects one side of the triangle 162. In this case, the fetch mask bits of the associated fetch mask 150 are set to indicate only the intersecting portion 164 of the tile region 140. The ZROP unit provides a single tile memory address value specifying a particular tile, along with the fetch mask 150 specifying only the desired portions 164 of the tile of Z data. The memory interface unit is responsive to the tile memory address value, and associated fetch mask information, and operative to access only the specified portions of Z data. In one embodiment, each of the fetch mask bits is associated with 8 bytes of Z data, and only one clock cycle is needed to access 8 bytes of Z data. The fetch mask information is only used if the Z data is not compressed.

Figure 5:
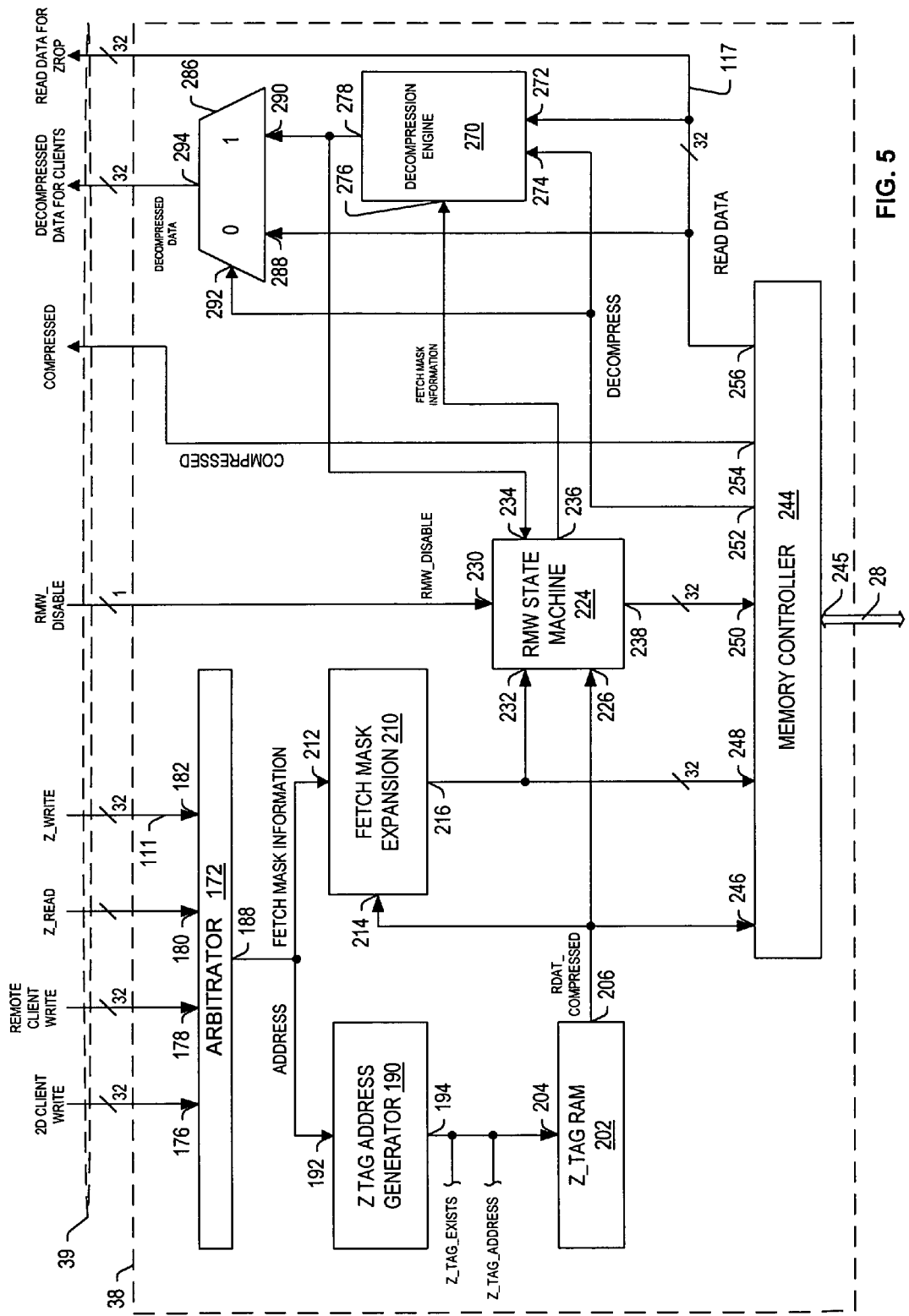
FIG. 5 is a generalized schematic circuit block diagram illustrating further details of the memory interface unit of FIG. 2B.

FIG. 5 shows a generalized schematic circuit block diagram illustrating further details of the memory interface unit 38 (FIG. 2B) of the graphics processing unit. The memory interface unit 38 includes an arbiter unit 172 for receiving and resolving requests for access to the Z buffer, the arbiter unit 172 having: an input port 176 for receiving write requests, write address values, and Z write data from port 54 of the 2D graphics engine 52 (FIG. 3); a remote client write request input port 178 for receiving write requests, write address values, and write Z data from a remote client such as the CPU; an input port 180 for receiving the Z_READ signal from port 108 of the ZROP unit 100 (FIG. 3), the Z_READ interface carrying read requests, read address values indicating portions of Z data to be read from the Z buffer, and associated Z data fetch information indicating selected portions of the tiles of Z data to be read from the Z buffer; an input port 182 for receiving the Z_WRITE signal carrying write requests, write address values, and write Z data from port 110 of the ZROP unit; and an output port 188.

The memory interface unit 38 also includes: a depth value tag address generator 190 having a port 192 for receiving memory address values from output port 188 of the arbiter unit 172, and being operative to provide a mapping between dynamically allocated Z buffer memory address values and a plurality of Z_TAG bits each being indicative of whether an associated tile of Z data is stored in the Z buffer in a compressed format, and having an output port 194 providing a signal designated Z_TAG_EXISTS carrying information indicative of whether a Z_TAG bit exists for an associated Z buffer memory address value applied to the input 192, and also carrying information indicative of the value of the Z_TAG bit, the port 194 also providing a signal Z_TAG_ADDRESS; and a depth value tag RAM (Z_TAG RAM) 202 having an input port 204 for receiving the Z_TAG_EXISTS signal from port 194 of the Z tag address generator 190, and providing storage of the Z_TAG bits, and having an output port 206 for providing a read data compressed signal designated RDAT_COMPRESSED carrying associated ones of the Z_TAG bits and indicating the compression status of Z data. In one embodiment, the Z_TAG RAM 202 has a limited storage capacity that is sufficient to store Z_TAG bits for only a portion of the tiles of the Z buffer.

The memory interface unit 38 further includes: a fetch mask expansion unit 210 having an input port 212 for receiving fetch mask information from output port 188 of the arbiter unit 172, a port 214 for receiving the RDAT_COMPRESSED signal from port 206 of the Z_TAG RAM 202, and an output port 216 providing expanded fetch mask information; and a RMW state machine 224 having a port 226 for receiving the RDAT_COMPRESSED signal from port 206 of the Z_TAG RAM unit 202, a port 230 for receiving the RMW_DISABLE signal from port 112 of the ZROP unit 100 (FIG. 3), a port 232 for receiving the expanded fetch mask information from port 216 of the fetch mask expansion unit, a port 234 for receiving decompressed data, an output port 236 for providing expanded fetch mask information, and an output port 238 for providing Z buffer address values, and Z data to be written to the Z buffer.

The fetch mask expansion unit 210 is responsive to the associated Z tag bit and operative to expand the associated fetch mask information and provide it to the memory controller 244 if the Z tag bit indicates that the associated tile is not compressed. The RMW state machine 224 interprets the expanded fetch mask information and makes appropriate requests to the Z buffer for accessing Z data. The advantage provided by using fetch masks, is that only desired Z data needs to be fetched, and the bandwidth of the local memory interface is utilized more efficiently.

As further explained below, the memory interface unit 38 is operative to perform RMW operations on behalf of clients such as the 2D graphics engine and the CPU. The memory interface unit 38 performs RMW operations on behalf of such clients under control of the RMW state machine 224. The ZROP unit 100 (FIG. 3) asserts the RMW_DISABLE signal when the ZROP unit provides requests to the arbiter unit 172 for accessing the Z buffer. In operation, the RMW state machine 224 is responsive to the RMW_DISABLE signal received at its port 230, and if the RMW_DISABLE signal is asserted, then the RMW state machine 224 is disabled from performing RMW operations.

The memory interface unit 38 also includes: a memory controller 244 having a port 245 communicatively coupled with the Z buffer via the local memory interface 28, an input port 246 for receiving the RDAT_COMPRESSED signal from the Z_TAG RAM unit 202; an input port 248 for receiving the expanded fetch mask information from port 216 of the fetch mask expansion unit; an input port 250 for receiving memory address values for addressing the Z buffer, and Z data from port 238 of the RMW state machine 224, an output port 252 for providing a signal designated COMPRESSED carrying Z_TAG bits indicative of whether a portion of Z data read from an associated portion of the Z buffer has been read out in a compressed format, an output port 254 for providing a signal designated DECOMPRESS carrying Z_TAG bits indicative of whether a tile of Z data read from the Z buffer needs to be decompressed, and an output port 256 providing Z data read from the Z buffer. In one embodiment, the memory controller unit 244 is a DRAM controller. Note that the Z_TAG bits received by the memory controller via the RDAT_COMPRESSED signal, are essentially shifted through registers (not shown) of the memory controller, and provided at ports 252 and 254 to generate the DECOMPRESS signal and the COMPRESSED signal.

The memory controller 244 is responsive to address values and to the fetch mask information, and is operative to access specified portions of Z data stored in the Z buffer. The memory controller 244 is further responsive to the RDAT_COMPRESSED signal. If the Z_TAG value indicates that a tile is uncompressed, the memory controller uses the fetch mask information to access only the specified 8 byte portions of Z data, each 8 byte portion requiring one clock cycle to access. Alternatively, if the Z_TAG bit indicates that the tile is compressed, the memory controller accesses the compressed data while disregarding the fetch mask.

The memory interface unit 38 further includes: a decompression engine 270 having an input port 272 for receiving Z data read from the Z buffer, and being operative to convert Z data received in a compressed format to a decompressed format, and having an input port 274 for receiving the DECOMPRESS signal, an input port 276 for receiving fetch mask information from port 236 of the RMW state machine, and an output port 278 for providing decompressed Z data; a multiplexer 286 having a first input port 288 for receiving the read Z data from port 256 of the memory controller, a second input port 290 for receiving decompressed Z data from output port 278 of the decompression engine, a control input port 292 for receiving the DECOMPRESS signal, and an output 294 for selectively providing Z data from one of the input ports 288 and 290 in response to the DECOMPRESS signal. The Z data provided from output 294 of the multiplexer 286 is provided via the graphics engine 36 (FIG. 3) to an associated one of the clients.

In operation, the RMW state machine 224 is responsive to the RMW_DISABLE signal which is asserted by the ZROP unit 100 (FIG. 3) when the ZROP unit provides requests to the arbiter unit 172 for accessing the Z buffer. If the RMW_DISABLE signal is asserted, then the RMW state machine 224 is prevented from performing RMW operations.

Consider an example wherein the CPU is granted access to write Z data to specified pixels 142 (FIG. 4A) of a specified tile stored in the Z buffer. In this case, the RMW_DISABLE signal is not asserted, and the RMW state machine 224 receives client write information at its port 232 from the CPU, the client write information including current Z data provided by the CPU, a memory address value specifying a particular tile which the CPU needs to write to, and fetch mask information specifying pixels. Consider further that the RDAT_COMPRESSED signal carries a Z_TAG value indicating that the particular tile is stored in the Z buffer in a compressed format. Note that the fetch mask information is disregarded for purposes of reading the compressed tile of Z data. In this case, the RMW state machine 224 provides an address value specifying the particular tile to the memory controller 244 which responds by: reading the particular tile from the Z buffer in the compressed format; providing the compressed format Z data of the particular tile at its read data output port 256; and asserting the DECOMPRESS signal. The decompression engine 270: receives the compressed Z data of the particular tile at its port 272, and receives the associated fetch mask information at its port 276 from the RMW state machine; and generates decompressed Z data for the specified portions of the tile at the output port 278. The RMW state machine 224 then receives the decompressed Z data of the particular tile at its input port 234, merges the specified decompressed Z data with the current Z data provided by the CPU based on the associated fetch mask information, and writes the merged data forming a new tile back to the specified memory address of the Z buffer in an uncompressed format.

Figure 6A:
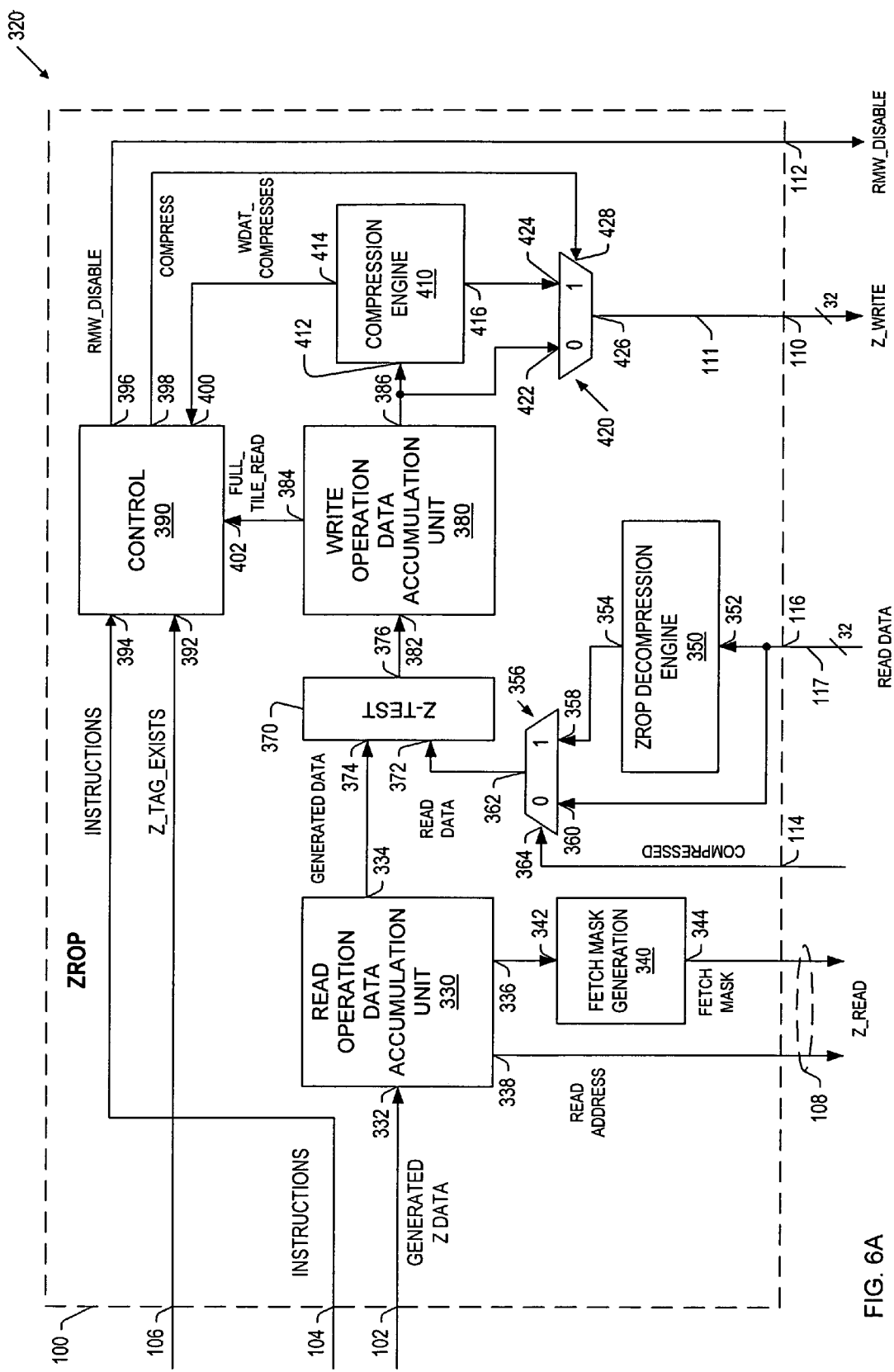
FIG. 6A is a detailed schematic circuit block diagram illustrating components of a Z data raster operations unit (ZROP unit) of the graphics engine of FIG. 2B.

FIG. 6A shows a generalized schematic circuit block diagram illustrating further details of the ZROP unit 100 (FIG. 3) in accordance with the present invention. The ZROP unit 100 includes: a read operation data accumulation unit 330 for accumulating generated Z data associated with tiles as further explained below, the unit 330 including an input port 332 for receiving generated Z data from port 76 of the upstream 3D pipeline stages 72 (FIG. 3), an accumulated Z data output port 334 providing accumulated Z data associated with tiles of Z data, an output port 336 providing fetch information indicating specified Z data associated with specified pixels of an associated tile for which current Z data has been accumulated, and a read address output port 338 for providing Z buffer memory address values for addressing the Z buffer in order to read a specified tile of Z data; a fetch mask generation unit 340 having an input port 342 for receiving the information indicating specified pixels of an associated tile from port 336 of the read operation accumulation buffer, and an output port 344 providing a fetch mask; a ZROP decompression engine 350 having an input 352 for receiving the READ_DATA signal carrying Z data read from the Z buffer via the memory controller 244 (FIG. 5), and an output port 354 providing de compressed Z data.

The ZROP unit 100 also includes: a multiplexer 356 having a first input 358 for receiving decompressed Z data from port 354 of the ZROP decompression engine, a second input port 360 for receiving read data via port 116 of the ZROP unit, a control signal input port 364 for receiving the COMPRESSED signal via port 114 of the ZROP unit, and an output port 362; a Z-test unit 370 having a first input port 372 coupled with port 362 of the multiplexer 356, an input port 374 for receiving generated data from output port 334 of unit 330, and an output port 376; a write operation accumulation buffer 380 for accumulating combined data, the buffer 380 including a port 382 communicatively coupled with port 376 of the Z-test unit 370, an output port 384 for providing a signal designated FULL_TILE_READ, and an output port 386.

The ZROP unit 100 also includes: a control unit 390 having an input 392 for receiving the Z_TAG_EXISTS signal from port 90 of the Z-tag address check unit 86 (FIG. 3), and an instructions input port 394 for receiving the Z buffer management instructions from port 78 of the upstream 3D pipeline stages 72 (FIG. 3), a RMW disable output 396 providing the RMW_DISABLE signal, a compress output port 398 providing a compress control signal designated COMPRESS, and a write data compresses input port 400 for receiving a signal designated WDAT_COMPRESSES; a compression engine 410 having an input port 412 for receiving accumulated combined data from port 386 of buffer 380, a write data compresses output port 414 for providing the WDAT_COMPRESSES signal to port 400 of the control unit 390, and a compressed data output port 416 for providing compressed accumulated merged data; and a multiplexer 420 having a first input port 422 for receiving the accumulated merged data from port 386 of buffer 380, a second input port 424 for receiving compressed accumulated merged Z data from port 416 of the compression engine 410, an output 426 for providing accumulated merged data to the Z_WRITE port 110 of the ZROP unit 100 via bus 111, the accumulated merged data provided at output 426 being selected from the uncompressed Z data and compressed Z data received input ports 422 and 424 respectively under control of the COMPRESS signal received at a control input port 428 from port 398 of the control unit. The compression engine 410 is operative to compress tiles of Z data for storage in the Z buffer.

Generally, as Z data is generated by the graphics pipeline, and previous Z data is read from the Z buffer, the current and previous Z data are compared by the Z test unit 370 (FIG. 6A) and merged. The merged data is then tested to determine whether it is compressible, and if so, the tile is compressed by the compression engine 410 and written out to the Z buffer. If the tile cannot be compressed, it is written out to the Z buffer in an uncompressed format.

Figure 6B:
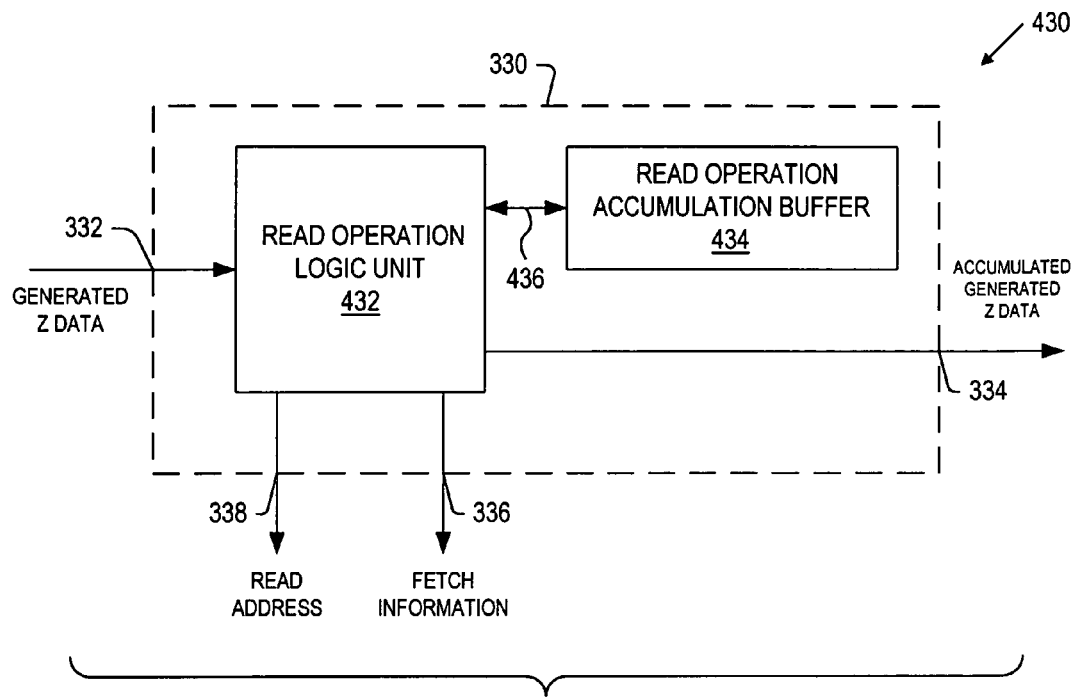
FIGS. 6B and 6C are schematic circuit block diagrams illustrating components of read and write operation data accumulation units of the ZROP unit of FIG. 6A.

FIG. 6B shows a generalized schematic circuit block diagram illustrating further details of the read operation data accumulation unit 330 (FIG. 6A) at 430. The accumulation unit 330 includes: a read operation accumulation logic unit 432 having an input port for receiving the generated Z data via port 332, an output port providing fetch information via port 336, an output port providing the read address values via port 338, and an output providing the accumulated Z data via port 334; and a read operation accumulation buffer 434 coupled with 330 unit via an interface 436. The unit 432 is operative to perform the steps of: determining portions of generated Z data associated with a current tile region; storing the determined portions in the accumulation buffer 434; determining an amount of accumulated Z data stored in the buffer 434 associated with the tile; and determining if the amount of accumulated Z data associated with a particular tile has reached a threshold value. If the amount of accumulated Z data associated with a particular tile has reached a threshold value, the unit 432: provides a read address value at port 338 indicating a previously written tile of Z data that is associated with the particular tile region; and provides the accumulated Z data associated with the particular tile at port 334. The read address value is used to address the Z buffer in order to read the previously written tile.

The read operation logic unit 432 is operative to accumulate generated Z data associated with a tile. The logic unit 432 tries to accumulate a tile of generated Z data before reading a tile from the Z buffer so that the reading of the tile is not duplicated for subsequently generated Z data. When performing 3D rendering for a tile, Z data associated with a first triangle is generated by the upstream 3D pipeline stages 72 (FIG. 3). Consider that the first triangle intersects with a first portion of the tile. Z data associated with a second triangle is subsequently generated by the upstream 3D pipeline stages 72 (FIG. 3), and a second triangle intersects with a second portion of tile. If the ZROP unit 100 (FIG. 6A) had proceeded to read the tile of Z data associated with the current tile after having received only the Z data associated with the first triangle, then the tile of Z data would have to be subsequently fetched again upon receiving the Z data associated with the second triangle. By accumulating Z data associated with the first and second triangles before reading the previous tile, the second read operation is avoided.

The read operation accumulation buffer 434 provides memory space sufficient for storing Z data associated with a plurality of tiles. However, because silicon real estate is limited in the current embodiment of the graphics unit, the read operation accumulation buffer is limited to a size adequate for storing 5 or 10 tiles of Z data. The read operation logic unit 432 provides for accumulating as many triangles as possible that cover associated portions of a given tile before executing a read operation. Optimally, the amount of generated Z data associated with a number of triangles is accumulated before an associated tile is fetched so that all pixels of the associated tile are needed by the time that the associated tile is fetched from the Z buffer. This accumulation operation provides optimal utilization of the bandwidth of the local memory interface 28 (FIG. 2B). After accumulating a threshold amount of Z data associated with a tile, the read operation logic unit 432 provides a read address at its port 338 and fetch information via port 336 for fetching specified portions of the particular tile of Z data from the Z buffer. Note that if the Z data accumulated is associated with objects covering the entire tile, then all of the tile of Z data is required to be fetched, and no fetch mask is needed. However, if the accumulated Z data is associated with one or more objects that do not cover the entire tile region, then the fetch mask generation unit 340 (FIG. 6A) expands fetch mask information received at its port 342 to generate a fetch mask indicating the specified Z data associated with specified pixels. Note further that if the particular tile of Z data to be fetched is indicated to be stored in a compressed format, then no fetch mask information is needed because it cannot be used.

The read operation unit 432 (FIG. 6B) performs the steps of receiving generated Z data associated with a first triangle; determining an associated tile region that is intersected by the first triangle; writing the tile address of the associated tile in an associated register in the read operation logic unit; configuring a coverage mask to indicate which pixels of the associated tile region are covered by the first triangle; receiving Z data associated with a second triangle, along with XY coordinates indicating a region of the Z buffer 44 (FIG. 2B); determining if the second triangle covers any portion of the associated tile region; and if the second triangle covers a portion of the tile region, revising the coverage mask associated with the tile region.

Upon receiving generated Z associated with a triangle, the read operation logic unit 432 determines if the triangle is associated with one of the tiles that is currently active in the read operation data accumulation unit. If so, the read operation logic unit 432 revises the coverage mask associated with the tile region, and determines whether the coverage mask indicates that a threshold portion of the tile region is covered. If the threshold portion is covered, and a threshold amount of the tile data is required to be read, the read operation logic unit reads the tile from the Z buffer and processes it. If the read operation logic unit determines that the generated Z data is associated with a triangle that does not cover one of the tile regions that is currently active in the read operation data accumulation unit, the read operation logic unit may begin accounting for a new tile region. Note that at the generated Z data received at port 332 of the read operation data accumulation unit from the upstream 3D pipeline stages 72 (FIG. 3) includes associated XY values which correspond with addresses of the Z buffer.

Note that generated Z data is written to the Z buffer without performing the normal Z buffer operations of reading, comparing, and rewriting merged data. The write without Z read operations are used in cases such as a picture-in-picture type scenario. Because programs executed by the CPU provide very unpredictable instructions, such as an instruction for rendering a pre-rendered object over an image, the graphics processing unit provides flexibility and must be robust, and therefore the compression scheme must be adaptable.

Figure 6C:
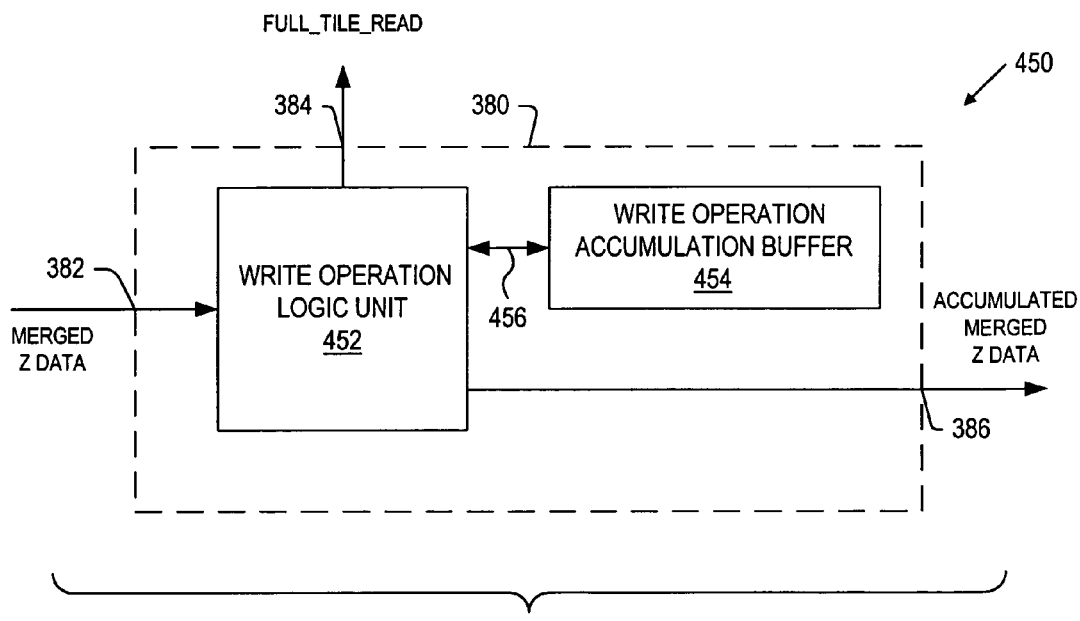

FIG. 6C shows a generalized schematic circuit block diagram illustrating further details of the write operation data accumulation unit 380 (FIG. 6A) in accordance with the present invention. The write operation data accumulation unit 380 includes: a write operation accumulation logic unit 452 having an input port for receiving the merged Z data via port 382, and an output for providing the accumulated merged Z data via port 386; and a write operation accumulation buffer 454 coupled with the write operation accumulation logic unit via an interface 456. The unit 452 is operative to perform the steps of: determining portions of merged Z data associated with a current tile region representing a plurality of pixels; storing the determined portions in the accumulation buffer 454; determining an amount of accumulated merged Z data stored in the buffer 454 that is associated with the tile; and determining if the amount of accumulated merged Z data has reached a threshold value. If so, the write operation data accumulation unit 452 reads the accumulated merged Z data associated with the particular tile from the buffer 454 and provides the accumulated merged Z data at port 386.

Figure 6D:
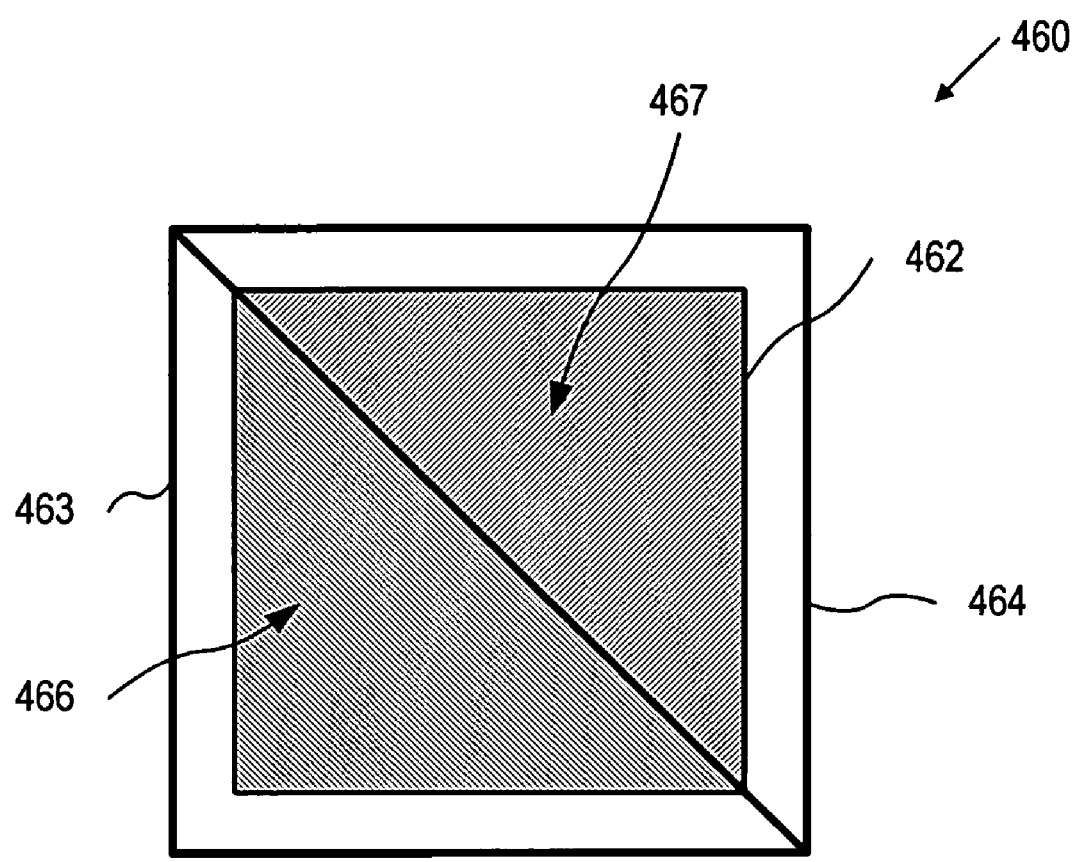
FIG. 6D is a block diagram generally illustrating a plurality of generated triangles intersecting a tile region of the Z buffer.

FIG. 6D shows a block diagram generally illustrating a tile region at 462 that is intersected by a first triangle 466 and a second triangle 467, each of the triangles having associated Z data that is generated by the upstream 3D pipeline stages 72 (FIG. 3) and received by the read operation data accumulation unit 330 (FIG. 6A).

FIG. 7A shows a table diagram at 470 illustrating values of signals generated and received by components of the ZROP unit 100 (FIG. 3) in accordance with a write operation for writing Z data to the Z buffer 44 (FIG. 2B) wherein the write operation requires an initial reading of Z data from the Z buffer. As is illustrated in the table, the control unit 390 (FIG. 6A) asserts the COMPRESS signal provided at its port 398 when the WDAT_COMPRESSES signal is asserted by the compression engine 410 to indicate that an associated tile of merged Z data is compressible. Note that if a tile of merged Z data cannot be compressed (as indicated by the WDAT_COMPRESSES signal being de-asserted), the COMPRESS signal is de-asserted and the multiplexer 420 (FIG. 6A) provides the uncompressed tile of Z data at its output 426. A FULL_WRITE signal generated within the control unit 390 is asserted to indicate that an associated tile of Z data must be stored in an uncompressed format. Note that the RMW_DISABLE signal is asserted by the control unit 390 (FIG. 6A) whenever the instructions received at port 394 of the control unit specify writing of Z data with a read of Z data.

FIG. 7B shows a table diagram at 472 illustrating values of signals generated and received by components of the ZROP unit 100 (FIG. 3) in accordance with a write operation for writing Z data to the Z buffer 44 (FIG. 2B) wherein the write operation does not require an initial reading of Z data from the Z buffer.

FIG. 7C shows a table diagram at 474 illustrating values of signals generated and received by components of the ZROP unit 100 (FIG. 3) in accordance with a fast clear operation.

Figure 8A:
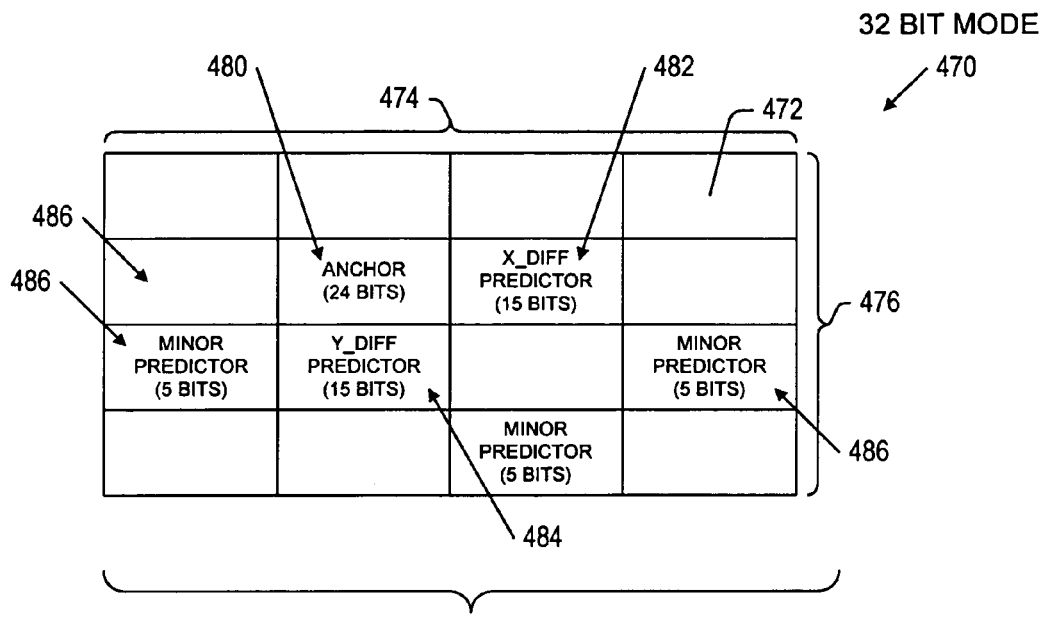
FIGS. 8A and 8B are block diagrams illustrating tile regions used in accordance with a Z data compression process in a 32-bit mode and a 16-bit mode of operation respectively.

FIG. 8A shows a block diagram generally illustrating a tile region at 470 defining a compression region of the Z buffer for use in a 32-bit operation mode. In the depicted embodiment, the tile 470 includes 16 pixels 472, the tile having a width 474 of 16 bytes, and a height 476 of 4 pixels, each of the pixels having 32 bits associated therewith for representing depth information. In one embodiment, 24 of the 32 bits of depth information are used to define an associated Z value, and the remaining 8 bits are used for stencil.

In accordance with one Z value compression scheme, an anchor pixel 480 is selected from the pixels 472 of the tile 470. As further explained below, the Z value associated with the anchor pixel 480 is to be stored with full precision which includes 24 bits in the 32-bit mode. In one embodiment, the anchor pixel 480 is chosen near the center of the tile 470 so that there is a probability that the anchor pixel has a Z value which is close to the average Z value of the tile. After selecting the anchor pixel, a first major difference pixel designated X_DIFF at 482 is selected, the X_DIFF pixel 482 being displaced a predetermined number of pixels in the X direction from the anchor pixel 480. The predetermined displacements between the X_DIFF pixel 482 and the anchor pixel, and between the Y_DIFF pixel 484 and the anchor pixel have been determined empirically in order to provide optimal compression performance. Best compression was achieved when the X_DIFF pixel 482 and the Y_DIFF pixel 484 were chosen to be close to the anchor pixel 480.

Having selected the anchor pixel 480, the X_DIFF pixel 482, and the Y_DIFF pixel 484, an X gradient value, and a Y gradient value are determined. The X gradient value is determined based on a difference between the Z value associated with the anchor pixel 480 and the Z value associated with the X_DIFF pixel 482. The Y gradient value is determined based on a difference between the Z value associated with the anchor pixel 480 and the Z value associated with the Y_DIFF pixel 484. In the 32-bit mode, 15 bits are allocated for storing the X gradient value in the Z buffer as a first major compression predictor value, or difference value, and 15 bits are allocated for storing the Y gradient value in the Z buffer as a second major compression predictor value, or difference value.

The Z value associated with the anchor point, the X gradient value, and the Y gradient value are then used to determine the tilt of an ideal plane that lies within the tile region 470. For each of the remaining pixels 486 of the tile 470, a minor Z difference value is determined between the actual Z value associated with the pixel and an associated projected Z value located on the ideal plane at the (x, y) coordinate associated with the pixel. In the 32-bit compression format, 5 bits are allocated for storing each of the minor Z difference values.

Often, the actual surface defined by the Z values of the pixels in the tile region will not be planar, such as, for example due to a seam formed between two polygons both of which intersect a tile. Therefore, the surface may be somewhat curved. Often, the predetermined number of bits allocated for each of the remaining pixels 486 compensates for a curve in the surface defined by the Z values of the pixels of the tile region. If a tile cannot be compressed so that the compression is loss-less, the tile is written in an uncompressed format. The criteria for determining whether a tile is compressible includes: determining whether the X gradient value may be stored using the allocated 15 bits; determining whether the Y gradient value may be stored using the allocated 15 bits; and determining whether the Z difference value for each of the remaining pixels may be stored using the allocated 5 bits. If any one of the X gradient value, the Y gradient value, and the plurality of minor Z difference values is too large to store using the corresponding number of allocated bits, then the tile may not be compressed.

Figure 8B:
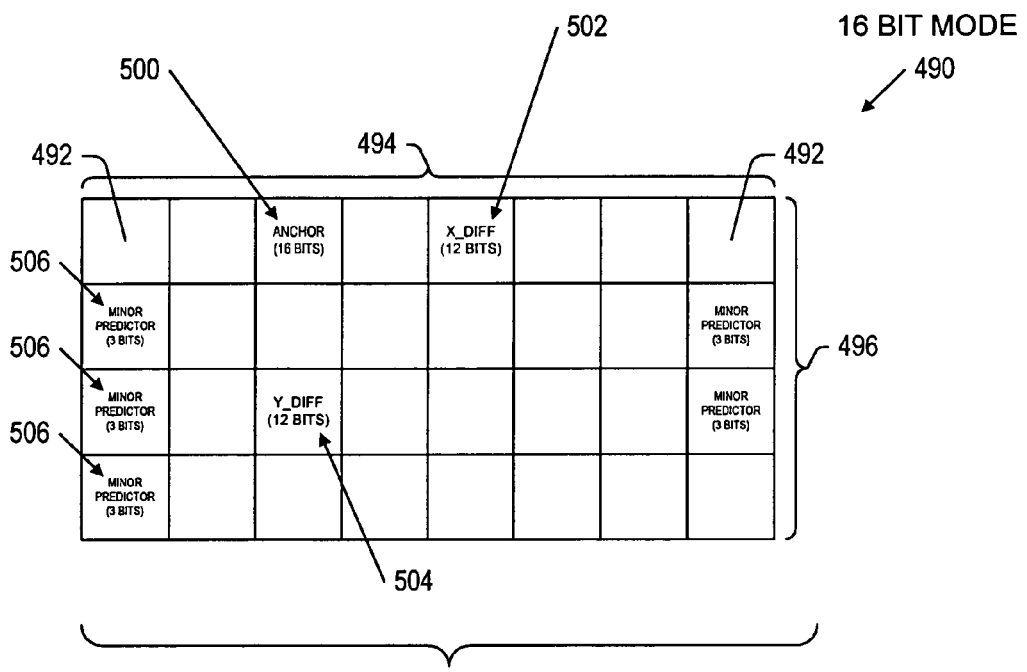

FIG. 8B shows a block diagram illustrating a tile region at 490 defining a compression region of the Z buffer for use in a 16-bit mode of operation. In the depicted embodiment, the tile 490 includes 32 pixels 492, the tile having a width 494 of 16 bytes, and a height 496 of 4 pixels, each of the pixels having 16 bits associated therewith for depth information.

Because each of the above defined tile regions 470 (FIG. 4A) and 490 are 16 bytes wide and 4 pixels tall, the number of bits allocated for each the Z value for each of the pixels differs by a factor of 2 depending on whether the system operates in the 16-bit mode or the 32-bit mode. In one embodiment of the 16-bit mode compression format, which is similar to the 32 bit mode format, an anchor pixel 500 is selected to be near the center of the tile, and the Z value associated with the anchor pixel 500 is stored with a full 16 bits of precision. A first major pixel designated X_DIFF at 502 is selected, the X_DIFF pixel being displaced two pixels in the horizontal direction from the anchor pixel. Also a second major pixel designated Y_DIFF at 504 is selected, the Y_DIFF pixel being displaced two pixels in the y direction from the anchor pixel 500. In one embodiment of the 16 bit-mode compression format, 12 bits are allocated for storing each of the X and Y gradient values, and 3 bits are allocated for storing the Z difference value associated with each of the remaining pixels 506 in the Z buffer.

Figure 8C:
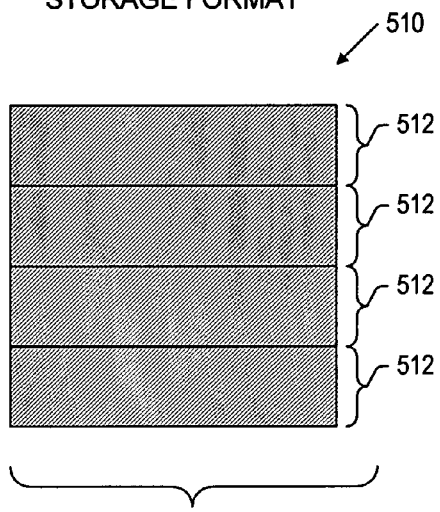
FIGS. 8C and 8D are block diagrams generally illustrating a tile of Z data stored in a tile region of the Z buffer in an uncompressed format, and in a compressed format respectively.

FIG. 8C shows a block diagram generally illustrating a tile of Z data at 510 as stored in a tile region of the Z buffer in an uncompressed format wherein the stored tile includes four 128-bit portions 512 of Z data. As mentioned above, in one embodiment of the present invention, the read data bus 117 (FIG. 5) and the Z-write data bus 111 (FIG. 5) are both 32-bit buses, and DDR is used so that each of the read data bus 117 and the Z-write data bus 111 (FIG. 5) provide 64 bits per clock cycle. In this embodiment, two clock cycles are required in order to write each 128-bit portion 512 of Z data to the Z buffer via the write data bus 111 (FIG. 5). Therefore, eight clock cycles are required to write the four portions 512 of Z data to the Z buffer via the local memory interface 28 (FIG. 2B) in the uncompressed storage format. Also in this embodiment, each fetch mask value 152 (FIG. 4B) is associated with an 8 byte portion of an associated tile of Z data, and one clock cycle is required to read each of the specified 8 byte portions.

Figure 8D:
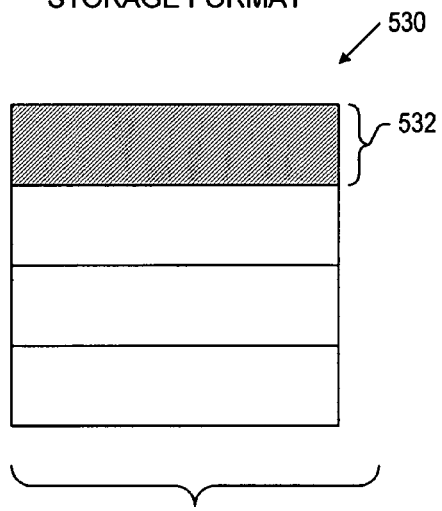

FIG. 8D is a block diagram generally illustrating a compressed tile of Z data 530 stored in a tile region of the Z buffer in a compressed format wherein the compressed tile of Z data 530 includes one 128-bit portion 532 of compressed Z data. Because the uncompressed tile of Z data 510 (FIG. 8C) includes four 128-bit portions 512 of Z data, while the compressed tile of Z data 530 includes only one 128-bit portion 532 of Z data, a compression ratio of 4 to 1 is achieved.

In the embodiment wherein the read data bus and the Z-write data bus are both 32-bit buses, and wherein DDR is used, only two clock cycles are required in order to write the entire tile of Z data 530 to the Z buffer. Because the writing of the compressed tile of Z data 530 requires only two clock cycles, while the writing of the uncompressed tile of Z data requires eight clock cycles, the effective bandwidth of the local memory interface 28 (FIG. 2B) is increased by a factor of four for writing Z data in the compressed format. In accordance with the described Z compression process, the compression ratio is 4 to 1 for both the 16-bit mode and the 32-bit modes of operation, and the compression is loss-less.

Figure 8E:
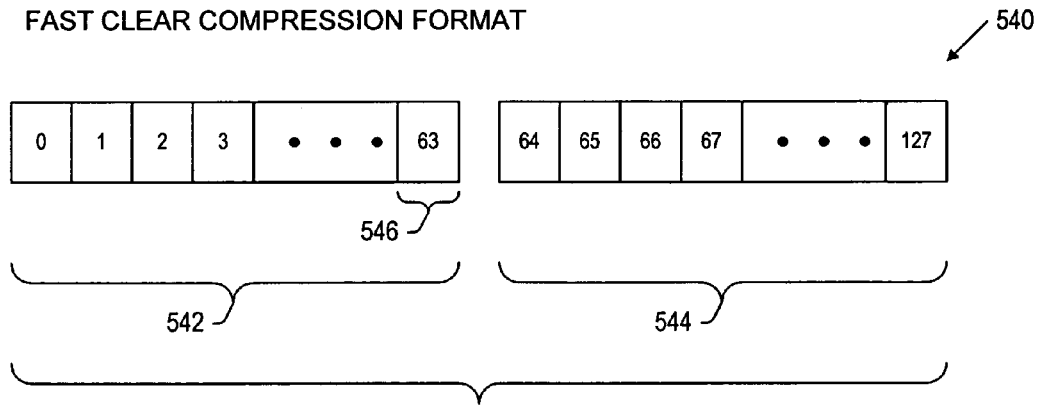
FIG. 8E is a block diagram illustrating a tile of Z data stored in a tile region of the Z buffer in accordance with an improved fast clear performance compression format.

FIG. 8E shows a block diagram generally illustrating a compressed fast clear tile of Z data at 540 including a 128-bit portion of Z data including a lower 64-bit portion 542, and an upper 64-bit portion 544. Because the Z buffer is re-used for each frame of image data, it is important to initialize the Z buffer as quickly as possible after a given frame has been processed. During a fast clear operation, all (x, y) positions of the Z buffer are initialized to a background value. Therefore, the Z value for each of the pixels of a tile is initialized to the same value, and so a plane defined by the Z values associated with each of the pixels of the tile has no tilt. Therefore, for the fast clear operation, the X gradient value, Y gradient value, and each of the minor Z difference values are all determined to be zero. So, only the anchor Z value is needed for fast clearing the Z buffer. Since the upper 64-bit portion 544 of Z data includes only minor predictor values which are all set to zero in accordance with fast clear operations, the upper 64-bit portion 544 of Z data provides no value for fast clear frames.

In accordance with the present invention, a fast clear bit 546 is used in the lower 64-bit portion 542 of compressed Z data, the fast clear bit 546 indicating whether or not each of the bits of the upper 64-bit portion 544 of compressed Z data is set to zero. If the fast clear bit 546 is set to zero, indicating that the frame is not a fast clear frame, the graphics processing unit 12 (FIG. 2B) must read the lower 64 bit portion 542 and the upper 64-bit portion 544. When the fast clear bit is set to one, indicating that the bits of the upper 64 bit portion 544 are all equal to zero, the graphics processing unit need not read the upper 64 bit portion. Therefore, for fast clear operations, the graphics processing unit only writes the lower 64 bit portion 642 to the Z buffer, and only one clock cycle is required to write the entire fast clear tile to the Z buffer, instead of two. Therefore, the time for executing a fast clear of the Z buffer is an 8× improvement over prior art uncompressed Z buffer fast clear operations.

When the graphics processing unit 12 (FIG. 2B) reads a tile region, an associated tag bit is read from the Z_TAG RAM unit 202 (FIG. 5) to determine whether the associated tile region is compressed. Without reading the fast clear bit, the memory interface unit 38 (FIG. 5) cannot determine whether the tile stored in the compressed format is a fast clear tile. However, by reading the fast clear bit 546, the memory unit interface 38 (FIG. 5) may determine whether the upper 64 bit portion 544 of the tile is all set to zero, and if so, disregard the upper 64 bit portion.

Figure 9A:
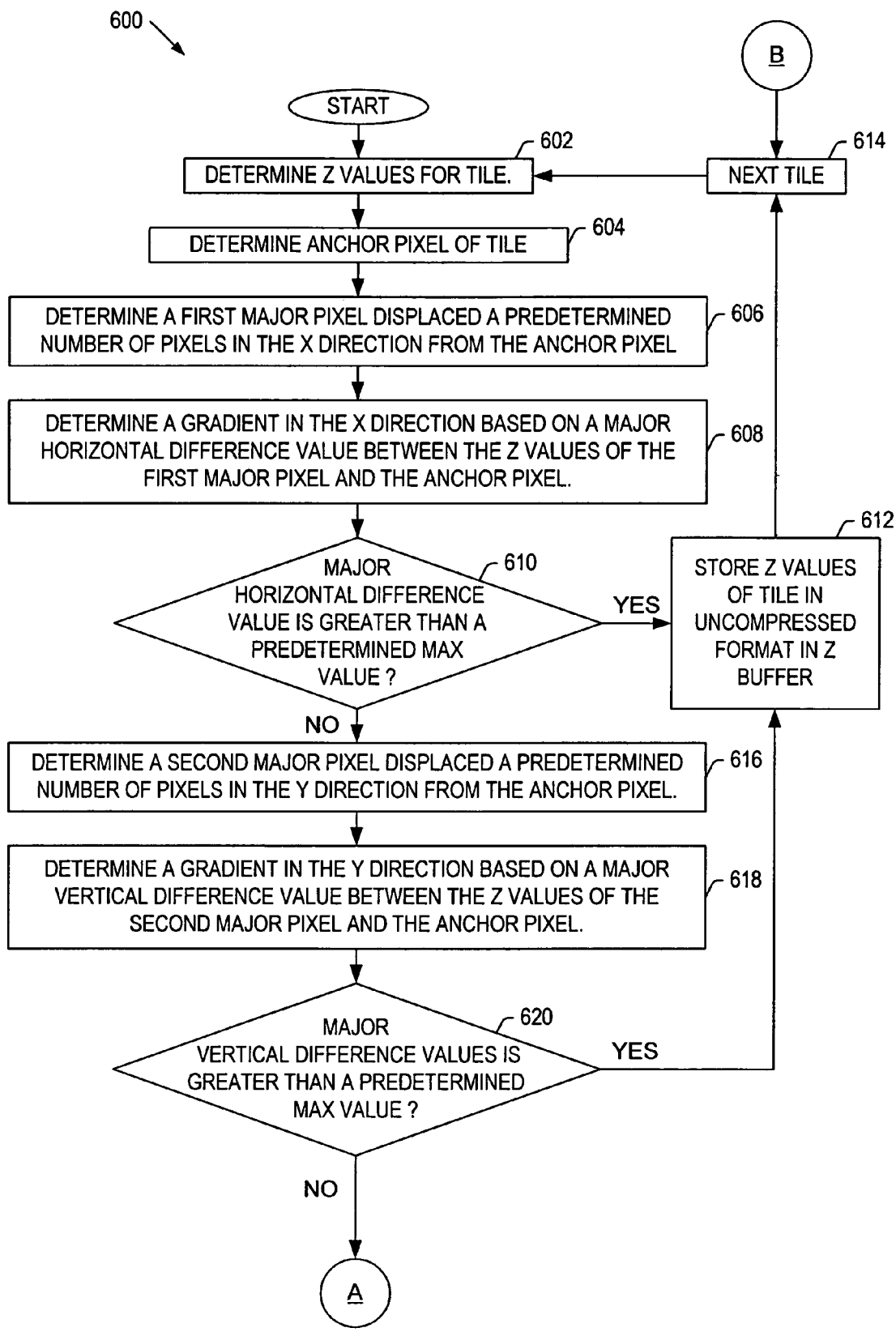
FIGS. 9A and 9B are flow diagrams illustrating a Z data compression process in accordance with one embodiment of the present invention.

FIG. 9A shows a flow diagram illustrating a Z data compression process at 600 that is executed by the compression engine 410 (FIG. 6A). The process 600 begins with step 602 in which accumulated merged Z data is received at the input port 412 of the compression engine 410 (FIG. 6A) as explained above. In step 604, the compression engine 410 (FIG. 6A) determines the anchor pixel 480 (FIG. 8A) and reads the Z value associated with the anchor pixel. In step 606, the compression engine determines a first major pixel, that is the X_DIFF pixel 482 (FIG. 8A) displaced a predetermined number of pixels in the X direction from the anchor pixel 480 (FIG. 8A). Also, in step 606, the compression engine reads the Z value associated with the X_DIFF pixel. In step 608, the compression engine determines an X gradient value based on a major horizontal difference value between the Z values of the X_DIFF pixel 482 (FIG. 8A) and the anchor pixel 480 (FIG. 8A).

In step 610, the compression engine determines whether the major horizontal difference value determined in step 608 is greater than a predetermined maximum value which is determined based on the number of bits allocated for the major horizontal difference value. In the 32-bit mode, 15 bits are allocated for the major horizontal difference value. Therefore, in the 32-bit mode, the predetermined maximum value for the horizontal difference is in a range between −16384 and 16383. In the 16-bit mode, 12 bits are allocated for the major horizontal difference value and therefore the predetermined maximum horizontal difference value for purposes of the determination at 610 is in a range between −2048 and 2047. If it is determined at 610 that the major horizontal difference is greater than the predetermined maximum value, the process proceeds to step 612 in which the graphics processing unit 12 (FIG. 1) stores the Z values of the tile in uncompressed format in the Z buffer. From step 612, the process proceeds to step 614 in which the compression engine 410 (FIG. 6A) receives another tile of accumulated merged Z data from the write operation data accumulation unit 380 (FIG. 6A), after which the process proceeds back to step 602.

Alternatively, if it is determined at 610 that the X gradient value determined in step 608 is not greater than the predetermined maximum value, the process proceeds to step 616 in which the compression engine determines the Y_DIFF pixel 484 (FIG. 8A) that is displaced a predetermined number of pixels in the Y direction from the anchor pixel 480 (FIG. 8A). Also, in step 616, the compression engine reads the Z value associated with the Y_DIFF pixel.

In step 618, the compression engine determines a Y gradient value based on a major vertical difference value between the Z values of the Y_DIFF pixel 484 (FIG. 8A) and the anchor pixel. From step 618, the process proceeds to step 620 in which the compression engine determines whether the major vertical difference value determined in step 618 is greater than a predetermined maximum value. In the 32-bit mode, 15 bits are allocated for the major vertical difference value. In the 16-bit mode, 12 bits are allocated for the major vertical difference value.

If it is determined at 620 that the major vertical difference value is greater than the predetermined maximum value, the process proceeds to execute steps 612 and 614 as described above. Alternatively, the process proceeds to "A" (to FIG. 9B) to execute further steps of the compression process.

Figure 9B:
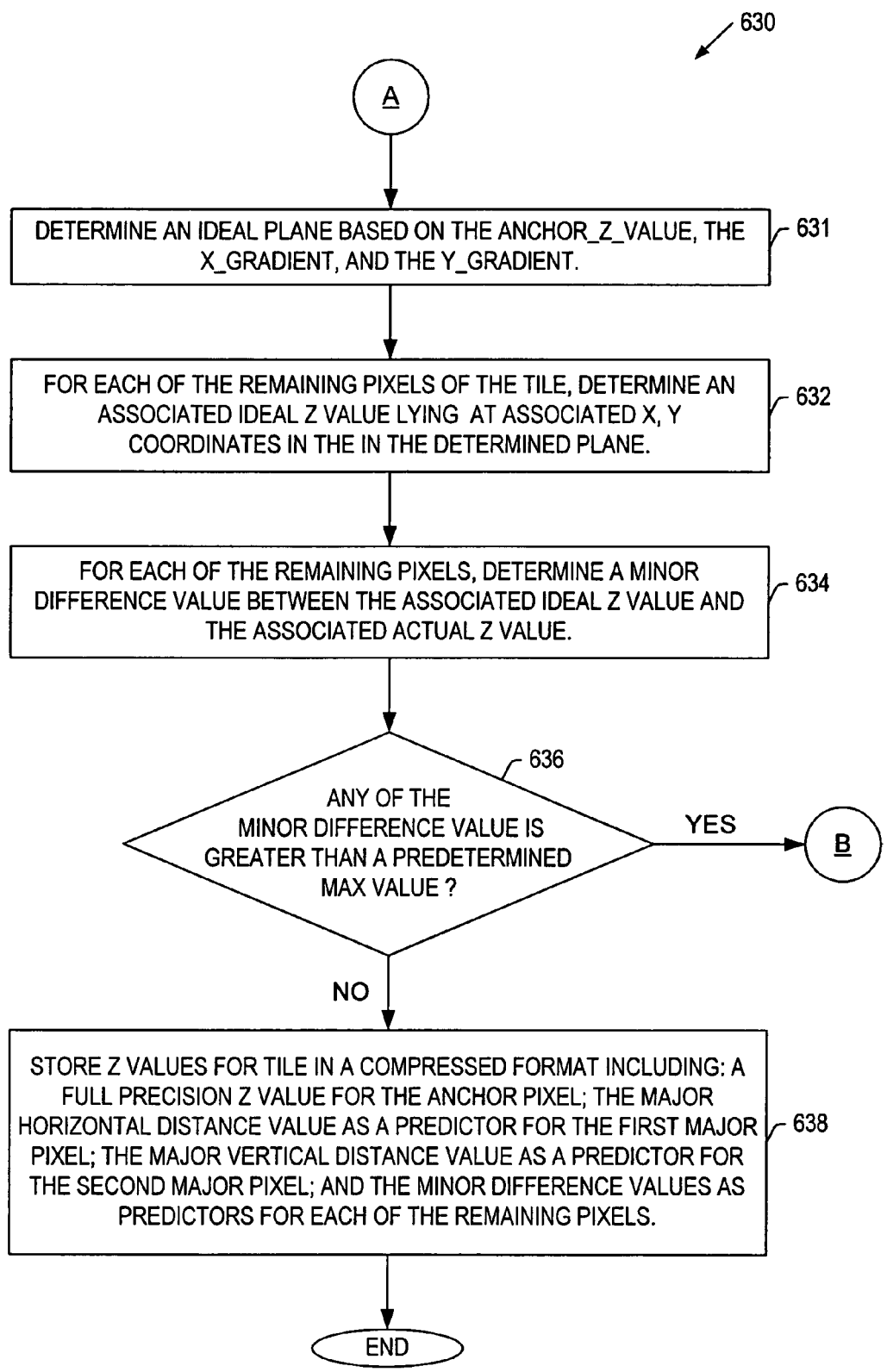

FIG. 9B shows a flow diagram illustrating further steps of the compression process which proceed from "A" (from FIG. 9A) to step 631 in which the compression engine determines an ideal plane based on the anchor Z value, the X gradient value, and the Y gradient value. In step 632, for each of the remaining pixels 486 (FIG. 8A) of the tile 470, the compression engine determines an associated ideal Z value lying at an associated (x, y) coordinate in the ideal plane determined in step 631. Note that each of the remaining pixels of the tile may have an associated actual Z value that is displaced at a distance in the Z direction from the associated ideal Z value lying at the associated XY coordinate. This arises if the surface defined by the Z values of the pixels in the tile region is not planar due to a seam formed by the intersection of two or more objects within the tile region. In step 634, the compression engine determines a minor difference value between the associated ideal Z value and the associated actual Z value for each of the remaining pixels. Each of the minor Z difference values determined in step 634 indicates the distance between the associated actual Z value and the associated ideal Z value lying on the plane determined in step 631.

It is then determined at 636 whether any of the minor difference values determined in step 634 is greater than a predetermined maximum value. In the 32-bit mode, five bits are allocated for each minor prediction value, and the predetermined maximum minor prediction value is 32. In the 16-bit mode, only three bits are allocated for each minor prediction value, and the predetermined maximum value for each minor prediction value is 8. If it is determined at 636 that at least one of the minor difference values is greater than the predetermined maximum value for the operation mode, the tile is stored in an uncompressed format. Alternatively, if it is determined at 636 that none of the minor difference values determined in step 634 is greater than the predetermined maximum value, the process proceeds to step 638 in which the compression engine stores Z values for the current tile in a compressed format including: a full precision Z value for the anchor pixel; the major horizontal distance value as a predictor for the X_DIFF pixel; the major vertical distance value as a predictor for the second major pixel; and the minor Z difference values as predictors for each of the remaining pixels.

Figure 10A:
FIGS. 10A and 10B are block diagrams generally illustrating 16-bit mode Z values and 32-bit Z mode values associated with a plurality of pixels of a tile.
Figure 10B:

FIG. 10A shows a block diagram generally illustrating Z values at 650 associated with a plurality of pixels of a 16-bit mode tile region. FIG. 10B is a block diagram generally illustrating Z values at 660 associated with a plurality of pixels of a 32-bit mode tile.

In accordance with one embodiment, the Z data compression process is used to compress linearly interpolated Z values expressed in accordance with a screen space view format. However, in accordance with the scope of the present invention, the Z data compression process may be applied to Z values expressed in accordance with a floating point format, and in accordance with object space view formats or world space view formats. In the described embodiment of the present invention, as illustrated in FIG. 11A, Z values are stored in accordance with relationship 1 below.

$$Z = (1 - d/z) * f/(f - d) \tag{1}$$

where d represents the near plane and f represents the far plane. For compression, all Z terms are calculated to ½ least significant bit (LSB) accuracy, and then truncated to determine a final difference as expressed in relationship (2), below.

$$Z1\_DIFF = \text{floor}(Z1-(Z2-Z4\_DIFF/2.0)) \quad (2)$$

For decompression, all Z terms are calculated to ½ least significant bit accuracy, 0.5 is added, and then the Z term is truncated as expressed in relationship (3), below.

$$Z1 = \text{floor}(Z1\_DIFF+(Z2-Z4\_DIFF/2.0)+0.5) \quad (3)$$

Figure 12B:
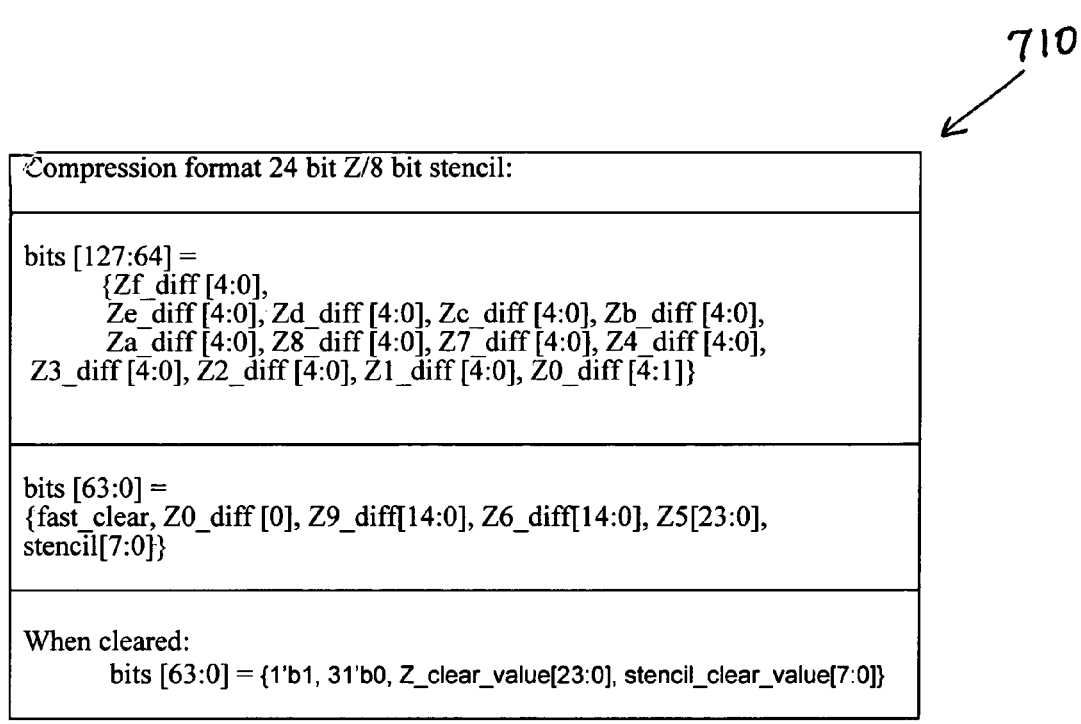
FIG. 12B is a table diagram illustrating a 32-bit mode compression format.

FIG. 11A shows a table diagram illustrating relationships at 670 for determining compression predictor values, or difference values, for each of the Z values of the 16-bit mode tile region of FIG. 10A. FIG. 11B shows a table diagram illustrating a 16-bit mode compression format at 680 in accordance with one embodiment of the present invention. FIG. 12A shows a table diagram illustrating relationships at 700 for determining compression predictor values for each of the Z values of the 32-bit mode tile region of FIG. 10B in accordance with one embodiment of the present invention. FIG. 12B shows a table diagram illustrating a 32-bit mode compression format at 710 in accordance with one embodiment of the present invention.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A computer graphics system for processing image data including Z data for use in displaying three dimensional images on a display unit, comprising:
    a depth buffer providing for temporary storage of Z data; and
    a graphics processing unit having a graphics engine for generating image data including Z data, and a memory interface unit communicatively coupled to the graphics engine and communicatively coupled to the depth buffer via a depth buffer interface, the graphics processing unit being operative to compress at least a portion of the generated Z data, to write the compressed portion of Z data to the depth buffer via the depth buffer interface in a compressed format, to read portions of compressed Z data from the depth buffer via the depth buffer interface, and to decompress the compressed Z data read from the buffer;
    wherein the graphics engine comprises:
        a plurality of graphics pipeline stages for generating image data including Z data; and
        a Z raster operations unit communicatively coupled with the memory interface unit, the Z raster operations unit for receiving the generated Z data, and being operative to compress selected portions of the generated Z data, to receive compressed Z data from the depth buffer via the memory unit interface and the depth buffer interface, and to decompress the compressed Z data;
    whereby effective Z data bandwidth through the depth buffer interface is maximized in order to facilitate fast depth buffer access operations.

2. A computer graphics system as recited in claim 1 wherein the graphics processing unit is operative to compress selected ones of a plurality of tiles of the generated Z data based on a quantitative analysis of the Z data, each of the tiles of Z data having a plurality of pixels arranged in an array, each of the pixels being disposed at an associated (X,Y) coordinate of the array, and having an associated Z value.

3. A computer graphics system as recited in claim 2 wherein the graphics processing unit is operative to perform a process of compressing a tile of Z data, the process including a step of determining a plane based on the (X,Y) coordinates and associated Z values of selected ones of the pixels of the tile.

4. A computer graphics system as recited in claim 2 wherein the graphics processing unit is operative to perform a process of compressing a tile of Z data, the process comprising the steps of:
    reading an anchor Z value associated with a selected anchor pixel of the tile;
    reading a major horizontal Z value associated with a major horizontal pixel displaced a first predetermined number of pixels in a horizontal direction from the anchor pixel;
    determining a major horizontal difference value between the anchor Z value and the major horizontal Z value;
    determining a horizontal gradient value based on the horizontal difference value and the first predetermined number of pixels;
    reading a major vertical Z value associated with a major vertical pixel displaced a second predetermined number of pixels in a vertical direction from the anchor pixel;
    determining a major vertical difference value between the anchor Z value and the major vertical Z value;
    determining a vertical gradient value based on the vertical difference value and the second predetermined number of pixels;
    determining an ideal plane based on the anchor Z value, the horizontal gradient value, and the vertical gradient value;
    for each of a plurality of remaining pixels of the tile, determining an associated ideal Z value lying in the ideal plane at the (X,Y) coordinate of the associated remaining pixel; and
    for each of the remaining pixels, determining an associated minor Z difference value by determining a difference between the associated ideal Z value and the associated Z value.

5. A computer graphics system as recited in claim 4 wherein the process further comprises the steps of:
    using the major horizontal difference value as a first major difference value in the compressed format;
    using the major vertical difference value as a second major difference value in the compressed format; and
    using the minor Z difference values as minor difference values in the compressed format.

6. A computer graphics system as recited in claim 4 wherein a compressed tile of Z data comprises:
    a first portion of compressed Z data including the anchor Z value, the major vertical difference value, and the major horizontal difference value; and
    a second portion of compressed Z data including at least one of the minor difference values.

7. A computer graphics system as recited in claim 4 wherein the graphics processing unit is further operative to perform the steps of:
    determining if the horizontal difference value is greater than a predetermined maximum value; and if the horizontal difference value is greater than the predetermined maximum value, writing the tile of Z data to the depth buffer via the depth buffer interface in an uncompressed format.

8. A computer graphics system as recited in claim 4 wherein the graphics processing unit is further operative to perform the steps of:
   determining if the vertical difference value is greater than a predetermined maximum value; and
   if the vertical difference value is greater than the predetermined maximum value, writing the tile of Z data to the depth buffer via the depth buffer interface in an uncompressed format.

9. A computer graphics system as recited in claim 4 wherein the graphics processing unit is further operative to perform the steps of:
   determining if any of the associated minor Z difference values is greater than a predetermined maximum value; and
   if any of the minor Z difference values is greater than a predetermined maximum value, writing the tile of Z data to the depth buffer via the depth buffer interface in an uncompressed format.

10. A computer graphics system as recited in claim 9 wherein the Z raster operations unit further comprises:
    a write operation accumulation unit for receiving the merged Z data, and being operative to accumulate portions of merged Z data that are associated with a current tile of merged Z data; and
    a compression engine for receiving the accumulated merged Z data, and being operative to compress the accumulated merged Z data to provide compressed Z write data to the memory interface unit to be written to the Z buffer in a compressed format.

11. A computer graphics system as recited in claim 4 wherein:
    the graphics engine is operative to compress a tile of Z data to generate a compressed tile of Z data including,
       a first compressed data portion including a portion of the compressed data, and fast clear information indicative of whether the compressed tile of Z data represents background initialization Z data for clearing the depth buffer, and if not fast clear compressed,
       a second compressed data portion; and
    the memory interface unit is responsive to the compressed tile of Z data, and operative to read the fast clear information, and further operative to perform the steps of,
       if the fast clear information indicates that the compressed tile represents initialization Z data, writing only the first compressed data portion to the depth buffer, and
       if the fast clear information does not indicate that the compressed tile represents initialization Z data, writing the first and second compressed data portions to the depth buffer.

12. A computer graphics system as recited in claim 2 wherein the Z raster operations unit is operative to perform read modify write operations including the steps of:
    reading a tile of previous Z data from the depth buffer via the memory unit interface and the depth buffer interface;
    merging the previous read Z data with associated portions of the generated Z data to provide a tile of merged Z data;
    determining if the tile of merged Z data may be compressed; and
    if the merged Z data may be compressed, writing the tile of merged Z data to the depth buffer via the memory unit interface and the depth buffer interface in a compressed format.

13. A computer graphics system as recited in claim 2 wherein the Z raster operations unit comprises:
    a read operation data accumulation unit for receiving the generated Z data, and being operative to accumulate portions of generated Z data associated with a current tile region, and to provide the accumulated Z data;
    a decompression engine for receiving a previously written compressed tile of read Z data that is read from the Z buffer via the memory interface unit in a compressed format, the decompression engine being operative to decompress the previously written compressed tile to provide decompressed read Z data; and
    a test unit for receiving the accumulated Z data and the decompressed read Z data, and being operative to compare portions of the accumulated Z data with portions of the decompressed read data, and being operative to provide selected Z data.

14. A computer graphics system as recited in claim 2 wherein:
    the graphics engine is operative to generate tile memory address values indicative of associated tile regions of the depth buffer, each tile region providing for storage of an associated tile of Z data, each of the tiles of Z data including a plurality of tile portions of Z data, the graphics engine also being operative to generate fetch mask information associated with each of the tile memory address values, the fetch mask information indicating specified ones of the tile portions of the associated tile of Z data, the specified tile portions to be read from the depth buffer; and
    the memory interface unit is responsive to the tile memory address values, and the associated fetch mask information, and operative to determine compression status information associated with at least a portion of the memory address values, the compression status information indicating whether the associated tile of Z data is stored at the associated tile region in a compressed format, or in an uncompressed format, the memory interface unit being operative to perform the steps of,
       if the compression status information indicates that the associated tile is a compressed tile that is stored in the depth buffer in a compressed format, accessing the compressed format tile using the associated tile memory address value, and
       if the compression status information indicates that the associated tile of data is stored in the depth buffer in an uncompressed format, accessing only the specified tile portions of the associated tile of Z data that are specified by the associated fetch mask information.

15. A computer graphics system as recited in claim 1 wherein the Z raster operations unit is operative to perform read modify write operations including the steps of:
    reading previous Z data from the depth buffer via the memory unit interface and the depth buffer interface;
    merging the previous read Z data with associated portions of the generated Z data to provide merged Z data; and
    writing the merged Z data to the depth buffer via the memory unit interface and the depth buffer interface.

16. A computer graphics system as recited in claim 15 wherein the read modify write operations further include the steps of:

compressing the merged Z data; and
writing the merged Z data to the depth buffer via the memory unit interface and the depth buffer interface in a compressed format.

17. A computer graphics system as recited in claim 1 wherein the Z raster operations unit is operative to perform read modify write operations including the steps of:
reading previous compressed Z data from the depth buffer via the memory unit interface and the depth buffer interface;
decompressing the read Z data;
merging the decompressed Z data with associated portions of the generated Z data to provide merged Z data; and
writing the merged Z data to the depth buffer via the memory unit interface and the depth buffer interface.

18. A computer graphics system as recited in claim 1 further comprising a depth buffer client communicatively coupled with the memory interface unit of the graphics processing unit, the client being operative to generate write requests, write address information, and write Z data to be written to the depth buffer, the memory interface being responsive to the write requests and operative to perform read modify write operations for writing the write Z data to the depth buffer for the client.

19. A computer graphics system as recited in claim 18 wherein the read modify write operations performed by the memory interface unit comprise the steps of:
determining whether a memory location of the depth buffer indicated by the write address information includes a portion of compressed Z data stored therein in a compressed format; and
if the tile region has a compressed portion of Z data stored therein,
reading the compressed portion of Z data from the depth buffer, and
decompressing the compressed portion of Z data.

20. A computer graphics system as recited in claim 18 wherein the depth buffer client is a central processing unit executing a graphics application.

21. A computer graphics system as recited in claim 18 wherein the depth buffer client is a 2D graphics engine.

22. A computer graphics system as recited in claim 1 wherein:
the graphics engine is operative to generate memory address values each being indicative of an associated memory address location of the depth buffer; and
the memory interface unit is responsive to the memory address values, and is operative to determine compression status information associated with at least a portion of the memory address values, the compression status information indicating whether an associated portion of Z data stored in the associated memory address location of the depth buffer is stored in a compressed format, or an uncompressed format, the memory interface unit being operative to perform the steps of,
if the compression status information indicates that the associated portion of data is stored in the depth buffer in an uncompressed format, accessing the associated portion of Z data from the depth buffer during a first number of clock cycles, and
if the compression status information indicates that the associated portion of data is stored in the depth buffer in a compressed format, accessing the compressed portion of Z data from the depth buffer during a second number of clock cycles wherein the second number of clock cycles is less than the first number of clock cycles.

23. A computer graphics system as recited in claim 22 wherein the memory interface unit further comprises a tag memory storage unit for storing the compression status information, the tag memory storage unit being responsive to a particular one of the memory address values, and operative to provide the compression status information associated with the particular memory address value.

24. A graphics processing unit for processing image data including Z data for use in displaying three dimensional images, the graphics processing unit being adapted for coupling with a depth buffer via a depth buffer interface, the depth buffer providing for temporary storage of Z data, the graphics processing unit being operative to compress at least a portion of the Z data, to write the compressed portion of Z data to the depth buffer via the depth buffer interface in a compressed format, to read portions of compressed Z data from the depth buffer via the depth buffer interface, and to decompress the compressed Z data read from the depth buffer, the graphics processing unit comprising:
a graphics engine for generating image data including Z data; and
a memory interface unit communicatively coupled to the graphics engine and being adapted for communicative coupling with a depth buffer via a depth buffer interface;
wherein the graphics processing unit is operative to perform read modify write operations including the steps of:
reading previous Z data from the depth buffer via the memory unit interface and the depth buffer interface;
merging the previous read Z data with associated portions of the generated Z data to provide merged Z data; and
writing the merged Z data to the depth buffer via the memory unit interface and the depth buffer interface.

25. A graphics processing unit as recited in claim 24 being further operative to compress selected ones of a plurality of tiles of the generated Z data based on a quantitative analysis of the Z data, each of the tiles of Z data having a plurality of pixels arranged in an array, each of the pixels being disposed at an associated (X,Y) coordinate of the array, and having an associated Z value.

26. A graphics processing unit as recited in claim 25 being further operative to perform a process of compressing a tile of Z data, the process including a step of determining a plane based on the (X,Y) coordinates and associated Z values of selected ones of the pixels of the tile.

27. A graphics processing unit as recited in claim 25 being further operative to perform a process of compressing a tile of Z data, the process comprising the steps of:
reading an anchor Z value associated with a selected anchor pixel of the tile;
reading a major horizontal Z value associated with a major horizontal pixel displaced a first predetermined number of pixels in a horizontal direction from the anchor pixel;
determining a major horizontal difference value between the anchor Z value and the major horizontal Z value;
determining a horizontal gradient value based on the horizontal difference value and the first predetermined number of pixels;
reading a major vertical Z value associated with a major vertical pixel displaced a second predetermined number of pixels in a vertical direction from the anchor pixel;

determining a major vertical difference value between the anchor Z value and the major vertical Z value;

determining a vertical gradient value based on the vertical difference value and the second predetermined number of pixels;

determining an ideal plane based on the anchor Z value, the horizontal gradient value, and the vertical gradient value;

for each of a plurality of remaining pixels of the tile, determining an associated ideal Z value lying in the ideal plane at the (X,Y) coordinate of the associated remaining pixel; and for each of the remaining pixels, determining an associated minor Z difference value by determining a difference between the associated ideal Z value and the associated Z value.

28. A graphics processing unit as recited in claim 25 wherein the Z raster operations unit is operative to perform read modify write operations including the steps of:

reading a tile of previous Z data from the depth buffer via the memory unit interface and the depth buffer interface;

merging the previous read Z data with associated portions of the generated Z data to provide a tile of merged Z data;

determining if the tile of merged Z data may be compressed; and if the merged Z data may be compressed, writing the tile of merged Z data to the depth buffer via the memory unit interface and the depth buffer interface in a compressed format.

29. A graphics processing unit as recited in claim 25 wherein the Z raster operations unit comprises:

a read operation data accumulation unit for receiving the generated Z data, and being operative to accumulate portions of generated Z data associated with a current tile region, and to provide the accumulated Z data;

a decompression engine for receiving a previously written compressed tile of read Z data that is read from the Z buffer via the memory interface unit in a compressed format, the decompression engine being operative to decompress the previously written compressed tile to provide decompressed read Z data; and a test unit for receiving the accumulated Z data and the decompressed read Z data, and being operative to compare portions of the accumulated Z data with portions of the decompressed read data, and being operative to provide selected Z data.

30. A graphics processing unit as recited in claim 25 wherein:

the graphics engine is operative to generate tile memory address values indicative of associated tile regions of the depth buffer, each tile region providing for storage of an associated tile of Z data, each of the tiles of Z data including a plurality of tile portions of Z data, the graphics engine also being operative to generate fetch mask information associated with each of the tile memory address values, the fetch mask information indicating specified ones of the tile portions of the associated tile of Z data, the specified tile portions to be read from the depth buffer; and the memory interface unit is responsive to the tile memory address values, and the associated fetch mask information, and operative to determine compression status information associated with at least a portion of the memory address values, the compression status information indicating whether the associated tile of Z data is stored at the associated tile region in a compressed format, or in an uncompressed format, the memory interface unit being operative to perform the steps of:

if the compression status information indicates that the associated tile is a compressed tile that is stored in the depth buffer in a compressed format, accessing the compressed format tile using the associated tile memory address value, and if the compression status information indicates that the associated tile of data is stored in the depth buffer in an uncompressed format, accessing only the specified tile portions of the associated tile of Z data that are specified by the associated fetch mask information.

31. A graphics processing unit as recited in claim 25 wherein:

the graphics engine is operative to compress a tile of Z data to generate a compressed tile of Z data including, a first compressed data portion including a portion of the compressed data, and fast clear information indicative of whether the compressed tile of Z data represents background initialization Z data for clearing the depth buffer, and if not fast clear compressed, a second compressed data portion; and the memory interface unit is responsive to the compressed tile of Z data, and operative to read the fast clear information, and further operative to perform the steps of, if the fast clear information indicates that the compressed tile represents initialization Z data, writing only the first compressed data portion to the depth buffer, and if the fast clear information does not indicate that the compressed tile represents initialization Z data, writing the first and second compressed data portions to the depth buffer.

32. A graphics processing unit as recited in claim 24 wherein the graphics engine comprises:

a plurality of graphics pipeline stages for generating image data including Z data; and a Z raster operations unit communicatively coupled with the memory interface unit, the Z raster operations unit for receiving the generated Z data, and being operative to compress selected portions of the generated Z data, to receive compressed Z data from the depth buffer via the memory unit interface and the depth buffer interface, and to decompress the compressed Z data.

33. A graphics processing unit as recited in claim 24 wherein the graphics processing unit is operative to perform read modify write operations including the steps of:

reading previous compressed Z data from the depth buffer via the memory unit interface and the depth buffer interface;

decompressing the read Z data;

merging the decompressed read Z data with associated portions of the generated Z data to provide merged Z data; and writing the merged Z data to the depth buffer via the memory unit interface and the depth buffer interface.

34. A graphics processing unit as recited in claim 33 wherein the read modify write operations further include the steps of:

compressing the merged Z data; and writing the merged Z data to the depth buffer via the memory unit interface and the depth buffer interface in a compressed format.

35. A graphics processing unit as recited in claim 24 wherein the read modify write operations further include the steps of:

compressing the merged Z data; and writing the merged Z data to the depth buffer via the memory unit interface and the depth buffer interface in a compressed format.

36. A graphics processing unit as recited in claim 24 wherein the graphics processing unit further comprises:

a write operation accumulation unit for receiving the merged Z data, and being operative to accumulate portions of merged Z data that are associated with a current tile of merged Z data; and a compression engine for receiving the accumulated merged Z data, and being operative to compress the accumulated merged Z data to provide compressed Z write data to the memory interface unit to be written to the Z buffer in a compressed format.

37. A graphics processing unit as recited in claim 24 wherein the memory interface unit further comprises a tag memory storage unit for storing the compression status information, the tag memory storage unit being responsive to a particular one of the memory address values, and operative to provide the compression status information associated with the particular memory address value.

38. A method for storing depth data, the method comprising:

identifying a plurality of pixels, each of the plurality of pixels associated with a corresponding depth value;

determining whether the depth values associated with the plurality of pixels are compressible;

responsive to the depth values associated with the plurality of pixels being compressible, compressing the depth values and storing at least an indication of the compressed depth values in a compressed format; and responsive to the depth values associated with the plurality of pixels being non-compressible, storing at least an indication of the depth values in a non-compressed form;

wherein determining whether the depth values are compressible comprises:

determining a gradient corresponding to a depth value associated with a first pixel and a depth value associated with a second pixel;

wherein the first pixel and the second pixel are included in the identified plurality of pixels.

39. The method of claim 38, wherein determining whether the depth values are compressible further comprises:

determining whether the gradient is greater than a threshold value;

whereby the depth values associated with the plurality of pixels are determined to be non-compressible when the gradient is greater than the threshold value.

40. The method of claim 38, wherein determining a gradient comprises:

determining a difference between the depth value for the first pixel and the depth value for the second pixel.

41. The method of claim 40, wherein determining a difference comprises:

determining a horizontal difference.

42. The method of claim 40, wherein determining a difference comprises:

determining a vertical difference.

43. The method of claim 38, wherein determining whether the depth values associated with the plurality of pixels are compressible comprises:

determining a difference between the depth value for the first pixel and the depth value for the second pixel.

* * * * *